(12) United States Patent
Shah et al.

(10) Patent No.: US 11,398,070 B1
(45) Date of Patent: Jul. 26, 2022

(54) BOUNDARY APPROXIMATION UTILIZING RADAR

(71) Applicant: Amazon Technologies, Inc., Seattle, WA (US)

(72) Inventors: Kandarp Shah, San Jose, CA (US); Pratik Kalpesh Patel, San Jose, CA (US); Jayashree Subramanian, Sunnyvale, CA (US); James J Wolfe, San Jose, CA (US); Srinath Byregowda, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 417 days.

(21) Appl. No.: 16/749,488

(22) Filed: Jan. 22, 2020

(51) Int. Cl.
*G01S 5/14* (2006.01)
*G01S 13/08* (2006.01)
*G06T 15/04* (2011.01)

(52) U.S. Cl.
CPC ............. *G06T 15/04* (2013.01); *G01S 5/14* (2013.01); *G01S 13/08* (2013.01); *G06T 2207/10028* (2013.01)

(58) Field of Classification Search
CPC . G06T 15/04; G06T 2207/10028; G01S 5/14; G01S 7/411; G01S 13/08; G01S 13/89
See application file for complete search history.

(56) References Cited

U.S. PATENT DOCUMENTS

| | | | |
|---|---|---|---|
| 7,995,055 B1 * | 8/2011 | Ma | G06V 10/44 382/154 |
| 9,977,983 B2 * | 5/2018 | Kochi | G01B 11/00 |
| 10,825,243 B1 * | 11/2020 | Akman | G06T 17/10 |
| 2005/0223337 A1 * | 10/2005 | Wheeler | G06T 19/00 715/806 |
| 2016/0061954 A1 * | 3/2016 | Walsh | G01C 15/002 356/139.03 |
| 2017/0169604 A1 * | 6/2017 | Van Der Zwan | G06T 3/40 |
| 2018/0330184 A1 * | 11/2018 | Mehr | G06F 30/13 |
| 2019/0242692 A1 * | 8/2019 | Saure | G06T 7/70 |
| 2019/0266741 A1 * | 8/2019 | Uehara | G01S 17/931 |
| 2020/0329358 A1 | 10/2020 | Hamre et al. | |
| 2020/0412949 A1 * | 12/2020 | Thogerson | H04N 5/23238 |
| 2021/0110607 A1 * | 4/2021 | Coddington | G06T 7/579 |

* cited by examiner

*Primary Examiner* — Erin F Heard
*Assistant Examiner* — Kenneth W Good
(74) *Attorney, Agent, or Firm* — Lee & Hayes, P.C.

(57) ABSTRACT

Systems and methods for boundary approximation utilizing radar are disclosed. For example, a heatmap of an environment may be generated utilizing data from reflected energy received at a device. The heatmap may be utilized to generate a point cloud representing the environment, where points of the point cloud indicate rates of change of energy intensity associated with surfaces in the environment. The points may be utilized to determine a mean line indicating an approximated distance between a portion of the environment, such as a wall, and the device.

20 Claims, 8 Drawing Sheets

700

```
Receive first data representing map of environment, wherein individual coordinates of
map indicate intensity of energy received from device disposed in environment
702
```

```
Generate, based at least in part on first data, second data indicating rate of change of
intensity associated with adjacent coordinates of map
704
```

```
Determine first set of points, associated with second data, that correspond to first set
of energy intensity maximums
706
```

```
Determine, based at least in part on first set of points, first distance between first
boundary structure of environment, represented by first set of points, and device
708
```

```
Determine second set of points, associated with second data, that correspond to
second set of energy intensity maximums
710
```

```
Determine third set of points, associated with second data, that correspond to third
set of energy intensity maximums
712
```

```
Determine, based at least in part on second set of points and third set of points,
second distance between second boundary structure represented by second set of
points and third boundary structure represented by third set of points, first boundary
structure connecting second boundary structure and third boundary structure
714
```

FIG. 7

BOUNDARY APPROXIMATION UTILIZING RADAR

BACKGROUND

Electronic devices are now common in many environments such as homes and offices. Some electronic devices may be utilized to detect events that occur in such environments. Understanding characteristics of the environments may be useful in detecting such events. Described herein are improvements in technology and solutions to technical problems that can be used to, among other things, determine environmental characteristics.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates a flow diagram of another example process for boundary approximation utilizing radar.

DETAILED DESCRIPTION

Figure 1:
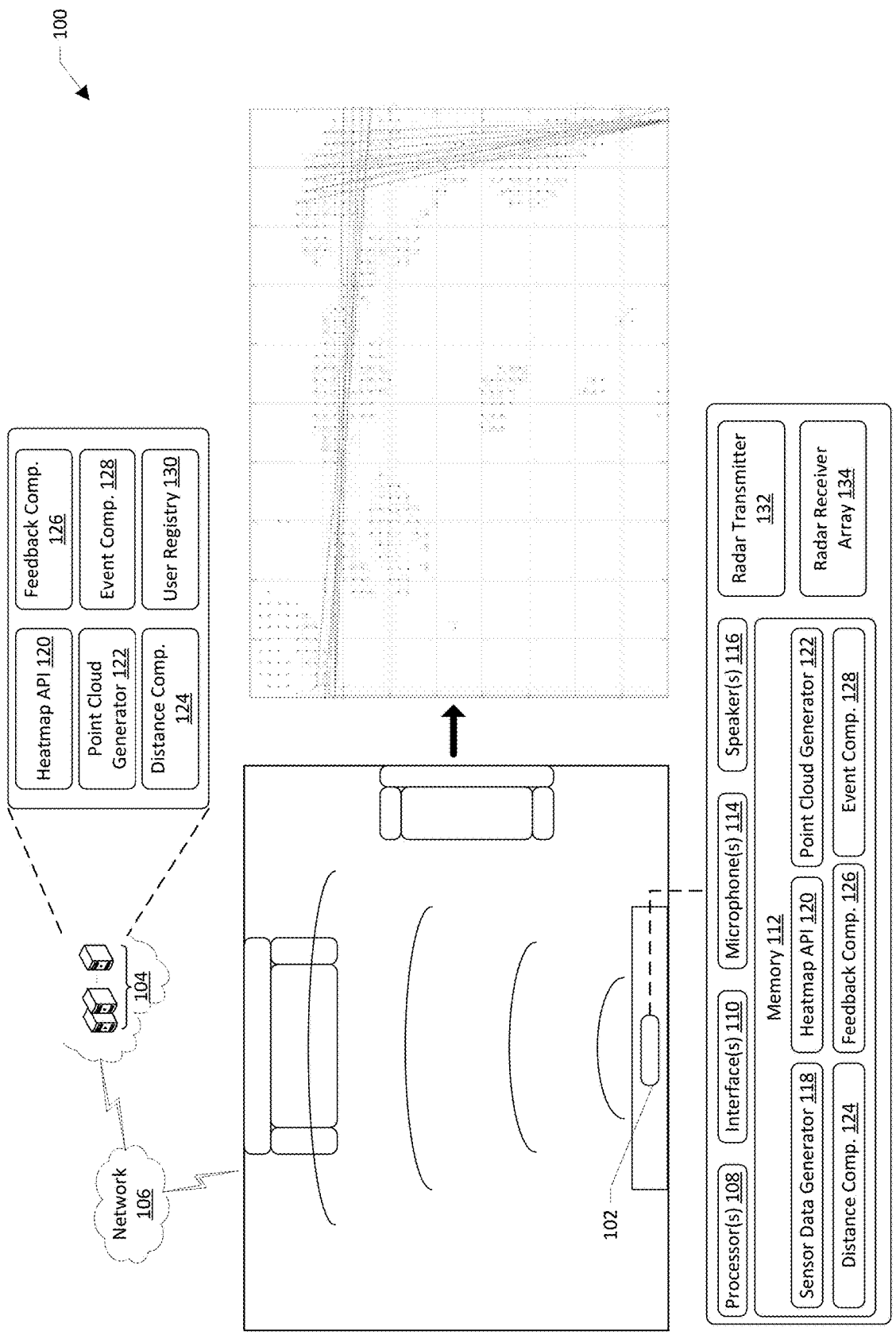
FIG. 1 illustrates a schematic diagram of an example environment for boundary approximation utilizing radar.

Systems and methods for boundary approximation utilizing radar are disclosed. Take, for example, an environment such as a room where one or more objects, such as furniture, and one or more subjects, such as users, may be disposed within the room. It may be advantageous to determine the boundary of the room for one or more applications, such as the detection of predefined events within the room, determining when events occur outside the room, determining which of many rooms an event occurs, etc. To determine the boundary of a given room, particularly with a degree of accuracy sufficient to be utilized for the one or more applications described herein, radar-based techniques may be performed. For example, an electronic device having radar functionality may be disposed in the room in question and/or an adjoining room. For example, the electronic devices may include voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a room of a home as described by way of example throughout this disclosure, in a place a business, healthcare facility (e.g., hospital, doctor's office, pharmacy, etc.), in vehicle (e.g., airplane, truck, car, bus, etc.) in a public forum (e.g., shopping center, store, etc.), etc.

The electronic device may include a radar transmitter and a radar receiver array. The radar transmitter may be configured to produce and emit electromagnetic waves in the radio or microwave domain. One or more transmitting antennas of the electronic device may transmit the electromagnetic waves from the antenna(s) and into the environment in question. The electromagnetic waves, also described herein as "transmitted energy," may emanate from the antenna(s) into the environment where the transmitted energy may interact with surfaces of objects in the environment and the walls of the environment. For example, the transmitted energy may reflect off the objects and/or walls and return to one or more receiving antennas. For example, the electronic device may include the radar receiver array, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). A receiver of the electronic device may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

Utilizing the sensor data, the electronic device and/or a remote system may generate a four-dimensional coherent heatmap of the environment. The heatmap may provide an indication in three-dimensional space of the surfaces that reflected the energy emitted into the environment by the radar transmitter. In addition, for some or all of the coordinates of the heatmap, the intensity of the energy received back at the electronic device may be provided. As such, the heatmap may indicate Cartesian coordinates for points corresponding to surfaces in the environment and energy intensity associated with some or each of those points. In examples, the heatmap may represent an averaging of locations associated with reflected energy and intensity of the reflected energy over a period of time. The heatmap may then be averaged or otherwise aggregated in the Z direction, such as by taking "slices" of the heatmap in the Z direction and averaging the energy intensities for some or all points in the X,Y axis. In some examples, certain angles and/or ranges of angles in the Z direction may be selected and averaged and/or may be weighted more heavily when averaging the intensity values. By so doing, the heatmap may provide an indication of which points are associated with the highest reflected energy and the X,Y coordinates of those points. It should be understood that the generation of the heatmap as described herein may be performed by the electronic device, by a remote system associated with the electronic device (such as a system associated with speech processing functionality) and/or another system that is not associated with the electronic device. In examples where the heatmap is generated by a system not associated with the electronic device, one or more application programming interfaces (APIs) may be utilized to interface between the electronic device and the system. In these examples, the electronic device may provide the sensor data to the system utilizing the APIs and may receive data representing the heatmap back from the system.

Utilizing the heatmap, a point cloud generator may be configured to generate a point cloud representing rates of energy intensity change associated with the environment. For example, a given coordinate of the heatmap may be associated with a first energy intensity and an adjoining or other associated coordinate may be associated with a second energy intensity. In examples where there is a large rate of change of those intensities, the rate of change may indicate the presence of a surface, and particularly a wall. In examples where there is a small rate of change, a wall may not be present and/or a small object may be present instead of a wall. In examples, points on the point cloud may be generated for rates of change that satisfy a predetermined threshold rate of change and/or for coordinates with intensity values that satisfy a threshold intensity value. The thresholds described herein may be static and/or may be dynamic and may be based at least in part on the rates of change associated with the environment in question. The result may include generation of data representing a point cloud of the environment with points on the point cloud representing points of high energy intensity and/or high rates of energy intensity change. The generation of the point clouds as described herein may be based at least in part on a two-dimensional constant false alarm rate algorithm. The point cloud generator may also be configured to determine one or more sectors of the point cloud. For example, groupings and/or clusters of points in a given area may be determined to be a sector. The sectors may also include an amount of space outside the grouping of points.

A distance component may be configured to utilize the point cloud generated as discussed herein to determine an approximated distance between the electronic device and one or more portions of the environment, such as walls. For example, for some or each of the sectors described above, a voting-based Hough transform may be utilized to find lines within a given sector that are associated with energy intensity maximums of the sector. For example, the Hough transform may be utilized to determine one or more lines that run through multiple points corresponding to the intensity maximums. A mean of the lines may be determined, and distance values associated with the mean line may be utilized to approximate a distance from the electronic device to the object represented by the mean line. In these examples, the object may include a wall of the environment, and the distance component may determine that the wall is one portion of the boundary of the environment and may determine an approximated distance to the wall.

This process of generating lines associated with intensity maximums may be performed for the other sectors of the point cloud such that the distance between the electronic device and the other walls of the environment may be determined. In addition, the intersection between walls may be determined by identifying the coordinates where the mean line for each sector intersects. By utilizing the techniques described herein, an approximated length of the environment may be determined and an approximated width of the environment may be determined. Data indicating these approximated boundaries may be generated and stored, such as in association with account data associated with the electronic device. This data may be utilized by one or more applications to assist in performing one or more operations associated with those applications.

For example, an event component may be configured to determine, from sensor data indicating an environmental change, that a predefined event has occurred, such as a person falling, a dog jumping up on a table, a window breaking, a package being left on a doorstep, etc. The event component may query the account data for the boundary information and may determine that a location associated with the detected event either was within the approximated boundary or was outside the approximated boundary. In examples where the event occurred within the approximated boundary, an action may be taken by the electronic device or an associated remote system. The action may include sending a notification of occurrence of the event to a personal device associated with the electronic device, establishing a communication channel between the electronic device and the personal device, particularly in examples where the electronic device includes a microphone and speaker, searching for other occupants associated with the environment to lend aid, etc. In examples where the event occurred outside the approximated boundary, the device and/or remote system may determine to refrain from performing the one or more actions that would otherwise be performed in examples where the event was within the boundary. In other examples when the event is detected outside the boundary, the device and/or remote system may perform actions other than that performed when the event is detected within the boundary.

Additionally, or alternatively, a feedback component may be configured to query and/or receive feedback data associated with the approximated boundary. For example, the electronic device may detect a moving object in the environment and may track or otherwise determine location changes associated with the movement. The location changes may be utilized to determine whether the approximated boundary is accurate. For example, if the location of the moving object moves beyond the approximated boundary, the system may determine that the approximated boundary is further from the electronic device than initially determined. In these examples, the system may generate data indicating the updated approximated boundary based at least in part on the location information of the moving object. Additionally, or alternatively, the system may utilize beaconing data sent and/or received from one or more personal devices, such as cellphones, tablets, watches, ear buds, etc. that may move within the environment. The beaconing data may indicate location changes of the personal devices, and the beaconing data may be utilized in the same or a similar way to the location of the moving object as described above. In still other examples, the location changes associated with moving objects and/or personal devices may be utilized to determine the location of a doorway and/or other ingress/egress points associated with the environment. For example, when the location changes indicate repeated moving of an object through the same or a similar location, that information may be utilized to determine that the location is associated with the ingress/egress point.

Additionally, or alternatively, the feedback component may be utilized to determine when subsequent boundary approximation operations are to be performed. For example, if a moving object is detected, such as from the sensor data generated by a sensor data generator, the system may determine that the moving object may alter the boundary approximation. In these examples, the electronic device may be caused to output additional electromagnetic waves into the environment and receive additional reflected energy to perform the boundary approximation techniques described herein. In this example, the subsequent boundary approximation may be utilized in addition to or alternatively from the initial boundary approximation. In examples where multiple boundary approximations are utilized, the boundary approximations associated with instances where a moving object was not detected may be weighted more favorably than boundary approximations associated with instances where an object was moving. Determining when to perform subsequent boundary approximation may also, or alternatively, be based at least in part on determining that the electronic device has moved positions. For example, a user may move the electronic device to a different position in the environment and/or to another environment. In these examples, the boundary approximation techniques described herein may be performed.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for boundary approximation utilizing radar. The system 100 may include, for example, an electronic device 102, which may include communal devices, personal devices, and/or devices configured with sensors to detect environmental changes. In certain examples, at least some of the devices 102 may be voice-enabled devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The system 100 may also include one or more other devices, such as personal devices, which may be electronic devices, such as a mobile phone, tablet, laptop, wearable device, and/or other computing device that is specifically associated with a given user profile. The electronic devices 102 may be configured to send data to and/or receive data from a remote system 104, such as via a network 106. Additionally, it should be understood that a given space and/or environment may include numerous electronic devices 102 and/or personal devices. It should also be understood that when a "space" or "environment" is used herein, those terms mean an area and not necessarily a given room, building, or other structure, unless otherwise specifically described as such.

The electronic devices 102 may include one or more components, such as, for example, one or more processors 108, one or more network interfaces 110, memory 112, one or more microphones 114, and/or one or more speakers 116. The microphones 114 may be configured to capture audio, such as user utterances, and generate corresponding audio data. The speakers 116 may be configured to output audio, such as audio corresponding to audio data received from another device and/or the system 104. It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. The electronic device 102 may also include a radar transmitter 132 and a radar receiver array 134. The radar transmitter 132 may be configured to produce and emit electromagnetic waves in the radio or microwave domain. One or more transmitting antennas of the electronic device 102 may transmit the electromagnetic waves from the antenna(s) and into the environment in question. The electromagnetic waves, also described herein as "transmitted energy," may emanate from the antenna(s) into the environment where the transmitted energy may interact with surfaces of objects in the environment and the walls of the environment. For example, the transmitted energy may reflect off the objects and/or walls and return to one or more receiving antennas. For example, the electronic device 102 may include the radar receiver array 134, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). A receiver of the electronic device 102 may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

The memory 112 may include one or more components such as, for example, a sensor data generator 118, one or more heatmap APIs 120, a point cloud generator 122, a distance component 124, a feedback component 126, and/or an event component 128, which will be described in more detail below. It should be understood that when voice-enabled devices are described herein, those voice-enabled devices may include phones, computers, and/or other computing devices.

The remote system 104 may include components such as, for example, a speech-processing system, a user registry 130, and one or more of the components from the memory 112 of the electronic device 102, such as the heatmap APIs 120, the point cloud generator 122, the distance component 124, the feedback component 126, and/or the event component 128. It should be understood that while the speech-processing system and/or the other components are depicted as separate from each other in FIG. 1, some or all of the components may be a part of the same system. The speech-processing system may include an automatic speech recognition component (ASR), a natural language understanding component (NLU), and/or a text-to-speech component (TTS). Each of the components described herein with respect to the remote system 104 may be associated with their own systems, which collectively may be referred to herein as the remote system 104, and/or some or all of the components may be associated with a single system. Additionally, the remote system 104 may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to the TTS component, a link or other resource locator for audio data, and/or a command to a device, such as the device 102.

In instances where a voice-enabled device is utilized, skills may extend the functionality of devices 102 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device, and send data and/or instructions associated with the input to one or more other devices.

The components of the remote system 104 are described in detail below. In examples, some or each of the components of the remote system 104 may include their own processor(s), network interface(s), and/or memory. As such, by way of example, the speech-processing system may include and/or be associated with processor(s), network interface(s), and/or memory. The other components of the remote system 104, such as the point cloud generator 122 and/or the distance component 124, may include and/or be associated with different processor(s), network interface(s), and/or memory, or one or more of these components may utilize some or all of the same processor(s), network interface(s), and/or memory utilized by the speech-processing system. These components are described in detail below. Additionally, the operations and/or functionalities associated with and/or described with respect to the components of the remote system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The components of the electronic device 102 and/or the remote system 104 will now be described by way of example.

The user registry component 130 may be configured to determine and/or generate associations between users, user accounts, and/or devices. For example, one or more associations between user accounts may be identified, determined, and/or generated by the user registry 130. The user registry 130 may additionally store information indicating one or more applications and/or resources accessible to and/or enabled for a given user account. Additionally, the user registry 130 may include information indicating device identifiers, such as naming identifiers, associated with a given user account, as well as device types associated with the device identifiers. The user registry 130 may also include information indicating user account identifiers, naming indicators of devices associated with user accounts, and/or associations between devices, such as the devices 102. The user registry 130 may also include information associated with usage of the devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system (not depicted) may be configured to receive audio data from the devices 102 and/or other devices and perform speech-processing operations. For example, the ASR component may be configured to generate text data corresponding to the audio data, and the NLU component may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "I need help," the NLU component may identify a "help" intent and the payload may be "present user." In this example where the intent data indicates an intent to receive aid, the speech-processing system may call one or more speechlets to effectuate the intent. Speechlets, as described herein may otherwise be described as applications and may include functionality for utilizing intent data to generate directives and/or instructions. For example, a communications speechlet may be called when the intent indicates that an action is to be performed associated with establishing a communication channel with another device. The speechlet may be designated as being configured to handle the intent of establishing a communication channel, for example. The speechlet may receive the intent data and/or other data associated with the user utterance from the NLU component, such as by an orchestrator of the remote system 104, and may perform operations to instruct the device 102 to perform an operation. The remote system 104 may generate audio data confirming that a communication channel has been established, in examples, such as by the TTS component. The audio data may be sent from the remote system 104 to the device 102 for output of corresponding audio by the speakers 116 of the device 102.

The sensor data generator 118 may be configured to utilize the received energy from the environment to generate sensor data indicating distance information associated with the surface that reflected the energy, an angle of the surface to the receiver array 134, and an intensity of the received energy. Additionally, in examples where multiple instances of energy are transmitted and received, such as over a period of time, the sensor data generator 118 may generate time stamp data to associate with the sensor data.

The heatmap APIs 120 may be configured to utilize the sensor data to generate a four-dimensional coherent heatmap of the environment. The heatmap may provide an indication in three-dimensional space of the surfaces that reflected the energy emitted into the environment by the radar transmitter 132. In addition, for some or all of the coordinates of the heatmap, the intensity of the energy received back at the electronic device 102 may be provided. As such, the heatmap may indicate Cartesian coordinates for points in the environment and energy intensity associated with some or each of those points. In examples, the heatmap may represent an averaging of locations associated with reflected energy and intensity of the reflected energy over a period of time. The heatmap may then be averaged or otherwise aggregated in the Z direction, such as by taking "slices" of the heatmap in the Z direction and averaging the energy intensities for some or all points in the X,Y axis. In some examples, certain angles and/or ranges of angles in the Z direction may be selected and averaged and/or may be weighted more heavily when averaging the intensity values. Thereafter, the heatmap may provide an indication of which points corresponding to the environment are associated with the highest reflected energy and the X,Y coordinates of those points. It should be understood that the generation of the heatmap as described herein may be performed by the electronic device 102, by the remote system 104 associated with the electronic device 102 (such as a system associated with speech processing functionality) and/or another system that is not associated with the electronic device 102. In examples where the heatmap is generated by a system not associated with the electronic device 102, one or more application programming interfaces (APIs) 120 may be utilized to interface between the electronic device 102 and the system. In these examples, the electronic device 102 may provide the sensor data to the system utilizing the APIs 120 and may receive data representing the heatmap back from the system.

Utilizing the heatmap, the point cloud generator 122 may be configured to generate a point cloud representing rates of energy intensity change associated with the environment. For example, a given coordinate of the heatmap may be associated with a first energy intensity and an adjoining or other associated coordinate may be associated with a second energy intensity. In examples where there is a large rate of change of those intensities, the rate of change may indicate the presence of a surface, and particularly a wall. In examples where there is a small rate of change, a wall may not be present and/or a small object may be present instead of a wall. In examples, points on the point cloud may be generated for rates of change that satisfy a predetermined threshold rate of change and/or for coordinates with intensity values that satisfy a threshold intensity value. The thresholds described herein may be static and/or may be dynamic and may be based at least in part on the rates of change associated with the environment in question. The result may include generation of data representing a point cloud of the environment with points on the point cloud representing points of high energy intensity and/or high rates of energy intensity change. The generation of the point clouds as described herein may be based at least in part on a two-dimensional constant false alarm rate algorithm. The point cloud generator 122 may also be configured to determine one or more sectors of the point cloud. For example, groupings and/or clusters of points in a given area may be determined to be a sector. The sectors may also include an amount of space outside the grouping of points.

The distance component 124 may be configured to utilize the point cloud generated as discussed herein to determine an approximated distance between the electronic device 102 and one or more portions of the environment, such as walls. For example, for some or each of the sectors described above, a voting-based Hough transform may be utilized to find lines within a given sector that are associated with energy intensity maximums of the sector. For example, the Hough transform may be utilized to determine one or more lines that run through multiple points corresponding to the intensity maximums. A mean of the lines may be determined, and distance values associated with the mean line may be utilized to approximate a distance from the electronic device to the object represented by the mean line. In these examples, the object may include a wall of the environment, and the distance component 124 may determine that the wall is one portion of the boundary of the environment and may determine an approximated distance to the wall.

This process of generating lines associated with intensity maximums may be performed for the other sectors of the point cloud such that the distance between the electronic device 102 and the other walls of the environment may be determined. In addition, the intersection between walls may be determined by identifying the coordinates where the mean line for each sector intersects. By utilizing the techniques described herein, an approximated length of the environment may be determined and an approximated width of the environment may be determined. Data indicating these approximated boundaries may be generated and stored, such as in association with account data associated with the electronic device 102. This data may be utilized by one or more applications to assist in performing one or more operations associated with those applications.

For example, the event component 128 may be configured to determine, from sensor data indicating an environmental change, that a predefined event has occurred, such as a person falling, a dog jumping up on a table, a window breaking, a package being left on a doorstep, etc. While the event component 128 may utilize multiple data types to determine if a predetermined event has occurred, the user of radar-based data will be utilized by way of example. For example, a given device may include an ultra-wide band antenna configured to receive electromagnetic waves with a bandwidth at or around 6 GHz. The device may also include a millimeter-wave band antenna configured to receive electromagnetic waves with a bandwidth at or around 60 GHz. This dual-band radar functionality may be utilized to detect movement that is likely to correspond to a predefined event, such as a person falling. By utilizing dual-band radar functionality as described herein, the radar may be able to detect event occurrences in rooms or other types of spaces in both the room in which the sensing device is located and other, such as adjacent, rooms. For example, the electromagnetic waves may be received at the antennas and corresponding sensor data may be generated. The sensor data may be utilized by the device to determine if one or more predefined events have occurred. Event data indicating that the device has determined that a predefined event has occurred may be sent from the device to a remote system for event-detection confirmation processing. In other examples, the sensor data may be sent from the device to another device and/or system, such as a remote system configured to process the sensor data, to determine whether the one or more predefined events has occurred. In this way, detection of an event may include detection of a motion-based event utilizing one or more of the processes and/or sensors described herein. When detecting events, one or more sensors may be utilized, such as the radar sensors described herein, microphones, motion sensors, cameras, temperature sensors, an accelerometer, a gyroscope, a heartbeat sensor, a liquid, such as perspiration, sensor, a global positioning system (GPS) sensor, and/or other sensors configured to detect an environmental change.

The event component 128 may query the account data for the boundary information and may determine that a location associated with the detected event either was within the approximated boundary or was outside the approximated boundary. In examples where the event occurred within the approximated boundary, an action may be taken by the electronic device 102 or an associated remote system 104. The action may include sending a notification of occurrence of the event to a personal device associated with the electronic device 102, establishing a communication channel between the electronic device 102 and the personal device, particularly in examples where the electronic device 102 includes the microphone 114 and speaker 116, searching for other occupants associated with the environment to lend aid, etc. In examples where the event occurred outside the approximated boundary, the device 102 may determine to refrain from performing the one or more actions that would otherwise be performed in examples where the event was within the boundary.

Additionally, or alternatively, the feedback component 126 may be configured to query and/or receive feedback data associated with the approximated boundary. For example, the electronic device 102 may detect a moving object in the environment and may track or otherwise determine location changes associated with the movement. The location changes may be utilized to determine whether the approximated boundary is accurate. For example, if the location of the moving object moves beyond the approximated boundary, the system 104 may determine that the approximated boundary is further from the electronic device 102 than initially determined. In these examples, the system 104 may generate data indicating the updated approximated boundary based at least in part on the location information of the moving object. Additionally, or alternatively, the system may utilize beaconing data sent and/or received from one or more personal devices, such as cellphones, tablets, watches, ear buds, etc. that may move within the environment. The beaconing data may indicate location changes of the personal devices, and the beaconing data may be utilized in the same or a similar way to the location of the moving object as described above. In still other examples, the location changes associated with moving objects and/or personal devices may be utilized to determine the location of a doorway and/or other ingress/egress points associated with the environment. For example, when the location changes indicate repeated moving of an object through the same or a similar location, that information may be utilized to determine that the location is associated with the ingress/egress point.

Additionally, or alternatively, the feedback component 126 may be utilized to determine when subsequent boundary approximation operations are to be performed. For example, if a moving object is detected, such as from the sensor data generated by the sensor data generator 118, the system 104 may determine that the moving object may alter the boundary approximation. In these examples, the electronic device 102 may be caused to output additional electromagnetic waves into the environment and receive additional reflected energy to perform the boundary approximation techniques described herein. In this example, the subsequent boundary approximation may be utilized in addition to or alternatively from the initial boundary approximation. In examples where multiple boundary approximations are utilized, the boundary approximations associated with instances where a moving object was not detected may be weighted more favorably than boundary approximations associated with instances where an object was moving. Determining when to perform subsequent boundary approximation may also, or alternatively, be based at least in part on determining that the electronic device 102 has moved positions. For example, a user may move the electronic device 102 to a different position in the environment and/or to another environment. In these examples, the boundary approximation techniques described herein may be performed.

It should be noted that while text data is described as a type of data utilized to communicate between various components of the remote system 104 and/or other systems and/or devices, the components of the remote system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1, several of the components of the remote system 104 and the associated functionality of those components as described herein may be performed by one or more of the electronic devices 102 and/or personal devices. Additionally, or alternatively, some or all of the components and/or functionalities associated with the electronic devices 102 and/or personal devices may be performed by the remote system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the remote system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the remote system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s)

108 and/or the processor(s) described with respect to the components of the remote system 104 may possess its own local memory, which also may store program components, program data, and/or one or more operating systems.

The memory 112 and/or the memory described with respect to the components of the remote system 104 may include volatile and nonvolatile memory, removable and non-removable media implemented in any method or technology for storage of information, such as computer-readable instructions, data structures, program component, or other data. Such memory 112 and/or the memory described with respect to the components of the remote system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the remote system 104 may be implemented as computer-readable storage media ("CRSM"), which may be any available physical media accessible by the processor(s) 108 and/or the processor(s) described with respect to the remote system 104 to execute instructions stored on the memory 112 and/or the memory described with respect to the components of the remote system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the remote system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 110 and/or the network interface(s) described with respect to the components of the remote system 104 may enable messages between the components and/or devices shown in system 100 and/or with one or more other polling systems, as well as other networked devices. Such network interface(s) 110 and/or the network interface(s) described with respect to the components of the remote system 104 may include one or more network interface controllers (NICs) or other types of transceiver devices to send and receive messages over the network 106.

For instance, each of the network interface(s) 110 and/or the network interface(s) described with respect to the components of the remote system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the remote system 104 may include a wide area network (WAN) component to enable message over a wide area network.

In some instances, the remote system 104 may be local to an environment associated the electronic devices 102 and/or personal devices. For instance, the remote system 104 may be located within one or more of the electronic devices 102 and/or personal devices. In some instances, some or all of the functionality of the remote system 104 may be performed by one or more of the electronic devices 102 and/or personal devices. Also, while various components of the remote system 106 have been labeled and named in this disclosure and each component has been described as being configured to cause the processor(s) to perform certain operations, it should be understood that the described operations may be performed by some or all of the components and/or other components not specifically illustrated.

Figure 2:
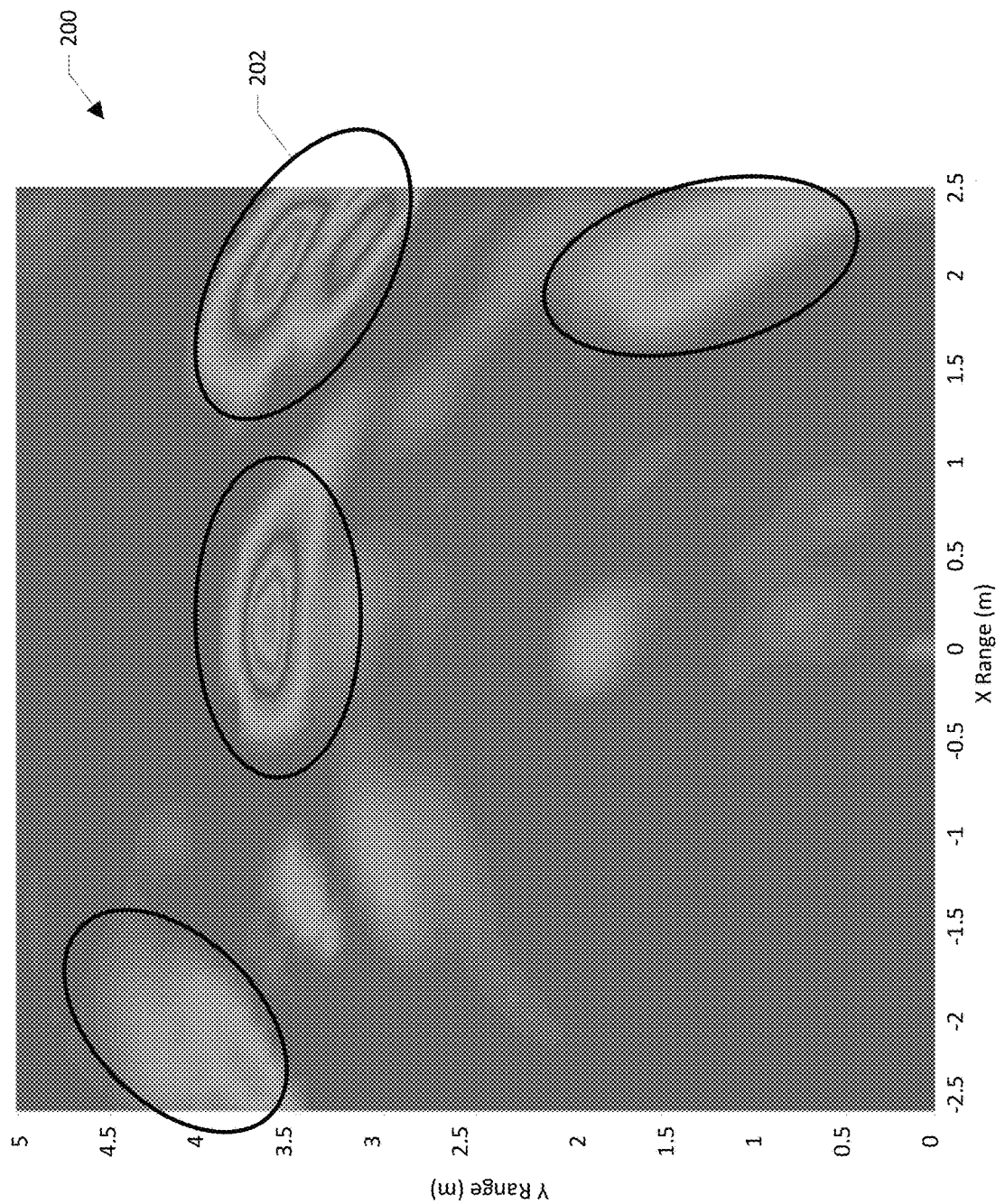
FIG. 2 illustrates an example coherent heatmap of received energy intensities for use with boundary approximation.

FIG. 2 illustrates an example coherent heatmap 200 of received energy intensities for use with boundary approximation. For example, a heatmap APIs may be configured to utilize radar-based sensor data to generate a four-dimensional coherent heatmap of an environment. The heatmap 200 may provide an indication in three-dimensional space of the surfaces that reflected the energy emitted into the environment by the radar transmitter. In addition, for some or all of the coordinates of the heatmap 200, the intensity of the energy received back at the electronic device may be provided. As such, the heatmap 200 may indicate Cartesian coordinates for points in the environment and energy intensity associated with some or each of those points. In examples, the heatmap 200 may represent an averaging of locations associated with reflected energy and intensity of the reflected energy over a period of time. The heatmap 200 may then be averaged or otherwise aggregated in the Z direction, such as by taking "slices" of the heatmap 200 in the Z direction and averaging the energy intensities for some or all points in the X,Y axis. In some examples, certain angles and/or ranges of angles in the Z direction may be selected and averaged and/or may be weighted more heavily when averaging the intensity values. Thereafter, the heatmap 200 may provide an indication of which points corresponding to the environment are associated with the highest reflected energy and the X,Y coordinates of those points.

As shown in FIG. 2, the encircled areas 202 show areas of high energy intensity, indicating areas of the environment where a perpendicular or substantially perpendicular surface to the electronic device is present. These encircled areas 202 may represent the most likely portions of the environment to correspond to walls. The X and Y values associated with the heatmap 200 are also provided. As shown in FIG. 2, the heatmap 200 illustrates reflected energy from objects being between 4.5 meters and 0.5 meters from the electronic device in the Y direction and from 2.5 meters to 0 meters in the X direction. It should be understood that the generation of the heatmap 200 as described herein may be performed by the electronic device, by the remote system associated with the electronic device (such as a system associated with speech processing functionality) and/or another system that is not associated with the electronic device. In examples where the heatmap is generated by a system not associated with the electronic device, one or more application programming interfaces (APIs) may be utilized to interface between the electronic device and the system. In these examples, the electronic device may provide the sensor data to the system utilizing the APIs and may receive data representing the heatmap back from the system.

Figure 3:
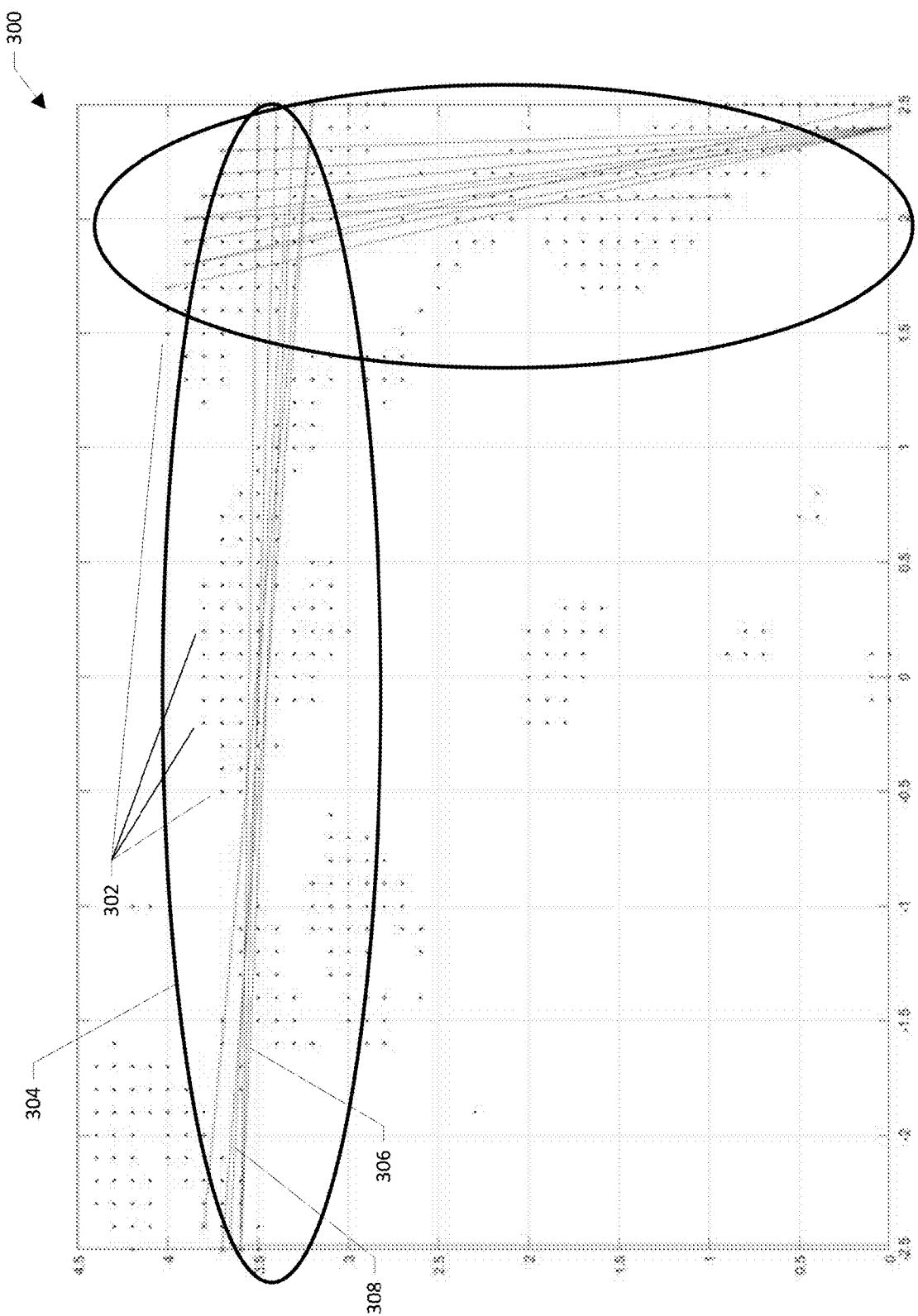
FIG. 3 illustrates an example point cloud utilized for boundary approximation.

FIG. 3 illustrates an example point cloud 300 utilized for boundary approximation. For example, utilizing a heatmap, such as the heatmap 200 from FIG. 2, a point cloud generator may be configured to generate a point cloud 300 representing rates of energy intensity change associated with the environment. For example, a given coordinate of the heatmap may be associated with a first energy intensity and an adjoining or other associated coordinate may be associated with a second energy intensity. In examples where there is a large rate of change of those intensities, the rate of change may indicate the presence of a surface, and particularly a wall. In examples where there is a small rate of change, a wall may not be present and/or a small object may be present instead of a wall. In examples, points on the point cloud may be generated for rates of change that satisfy a predetermined threshold rate of change and/or for coordinates with intensity values that satisfy a threshold intensity value. The thresholds described herein may be static and/or may be dynamic and may be based at least in part on the rates of change associated with the environment in question. The result may include generation of data representing a point cloud 300 of the environment with points 302 on the point cloud 300 representing points of high energy intensity and/or high rates of energy intensity change. The generation of the point clouds 300 as described herein may be based at least in part on a two-dimensional constant false alarm rate algorithm. The point cloud generator may also be configured to determine one or more sectors 304 of the point cloud. For example, groupings and/or clusters of points 302 in a given area may be determined to be a sector 304. The sectors 304 may also include an amount of space outside the grouping of points 302.

A distance component may be configured to utilize the point cloud 300 generated as discussed herein to determine an approximated distance between the electronic device and one or more portions of the environment, such as walls. For example, for some or each of the sectors 304 described above, a voting-based Hough transform may be utilized to find lines 306 within a given sector 304 that are associated with energy intensity maximums of the sector 304. For example, the Hough transform may be utilized to determine one or more lines 306 that run through multiple points 302 corresponding to the intensity maximums. A mean of the lines may be determined, and distance values associated with the mean line 308 may be utilized to approximate a distance from the electronic device to the object represented by the mean line 308. In these examples, the object may include a wall of the environment, and the distance component may determine that the wall is one portion of the boundary of the environment and may determine an approximated distance to the wall.

This process of generating lines 306 associated with intensity maximums may be performed for the other sectors 304 of the point cloud 300 such that the distance between the electronic device and the other walls of the environment may be determined. In addition, the intersection between walls may be determined by identifying the coordinates where the mean line 308 for each sector 304 intersects. By utilizing the techniques described herein, an approximated length of the environment may be determined and an approximated width of the environment may be determined. Data indicating these approximated boundaries may be generated and stored, such as in association with account data associated with the electronic device. This data may be utilized by one or more applications to assist in performing one or more operations associated with those applications. In addition, where less than three sectors 304 are determined, such as in scenarios where one of the wall of the environment includes multiple openings such as doors, windows, etc., the information associated with one or more of the other sectors 304 may be utilized to extrapolate information about the undefined sector 304.

Figure 4:
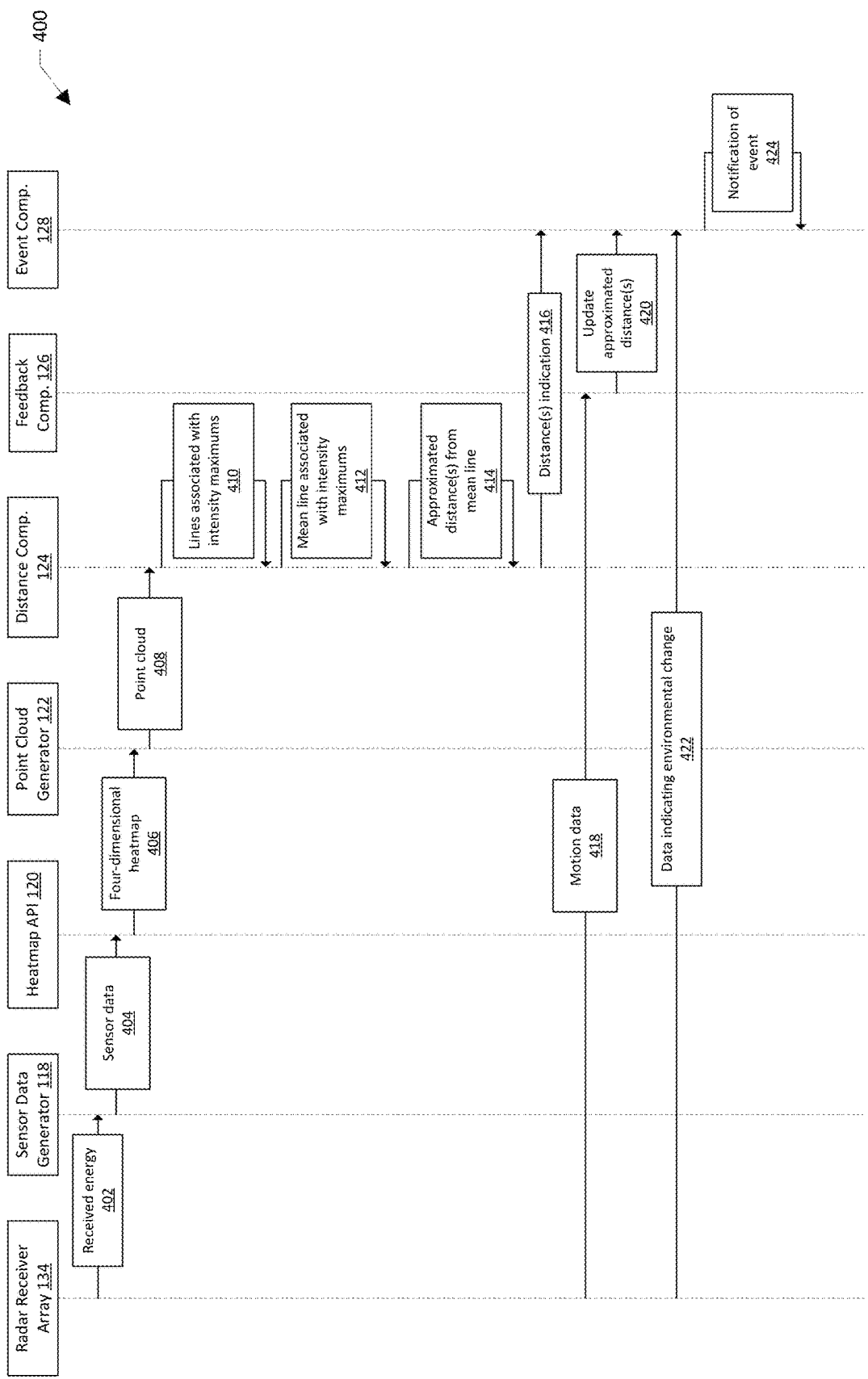
FIG. 4 illustrates a sequence diagram of example processes for boundary approximation utilizing radar.

FIG. 4 illustrates a sequence diagram 400 of example processes for boundary approximation utilizing radar. It should be understood that while the sequence diagram 400 is described in a stepwise manner, some or all of the operations described with respect to FIG. 4 may be performed in a different order and/or in parallel.

At block 402, the radar receiver array 134 may receive energy reflected off objects and/or walls associated with an environment and may utilize the sensor data generator 118 to generate sensor data corresponding to the received energy. The sensor data generator 118 may be configured to utilize the received energy from the environment to generate sensor data indicating distance information associated with the surface that reflected the energy, an angle of the surface to the receiver array 134, and an intensity of the received energy. Additionally, in examples where multiple instances of energy are transmitted and received, such as over a period of time, the sensor data generator 118 may generate time stamp data to associate with the sensor data.

At block 404, the sensor data generator 118 may provide the sensor data to the heatmap APIs 120. For example, a system may be configured to generate heatmaps and that remote system may provide the heatmap APIs 120 for the device to send the sensor data to be utilized for generating the heatmap.

At block 406, a heatmap may be received, such as utilizing the heatmap APIs, and a four-dimensional heatmap of the environment may be sent to the point cloud generator 122. The heatmap APIs 120 may be configured to utilize the sensor data to generate a four-dimensional coherent heatmap of the environment. The heatmap may provide an indication in three-dimensional space of the surfaces that reflected the energy emitted into the environment by the radar transmitter. In addition, for some or all of the coordinates of the heatmap, the intensity of the energy received back at the electronic device 102 may be provided. As such, the heatmap may indicate Cartesian coordinates for points in the environment and energy intensity associated with some or each of those points. In examples, the heatmap may represent an averaging of locations associated with reflected energy and intensity of the reflected energy over a period of time. The heatmap may then be averaged or otherwise aggregated in the Z direction, such as by taking "slices" of the heatmap in the Z direction and averaging the energy intensities for some or all points in the X,Y axis. In some examples, certain angles and/or ranges of angles in the Z direction may be selected and averaged and/or may be weighted more heavily when averaging the intensity values. Thereafter, the heatmap may provide an indication of which points corresponding to the environment are associated with the highest reflected energy and the X,Y coordinates of those points. It should be understood that the generation of the heatmap as described herein may be performed by the electronic device 102, by the remote system 104 associated with the electronic device 102 (such as a system associated with speech processing functionality) and/or another system that is not associated with the electronic device 102. In examples where the heatmap is generated by a system not associated with the electronic device 102, one or more application programming interfaces (APIs) 120 may be utilized to interface between the electronic device 102 and the system. In these examples, the electronic device 102 may provide the sensor data to the system utilizing the APIs 120 and may receive data representing the heatmap back from the system.

At block 408, the point cloud generator may generate a point cloud of energy intensity changes associated with the environment and may provide the point cloud to the distance component 124. For example, utilizing the heatmap, the point cloud generator 122 may be configured to generate a point cloud representing rates of energy intensity change associated with the environment. For example, a given coordinate of the heatmap may be associated with a first energy intensity and an adjoining or other associated coordinate may be associated with a second energy intensity. In examples where there is a large rate of change of those intensities, the rate of change may indicate the presence of a surface, and particularly a wall. In examples where there is a small rate of change, a wall may not be present and/or a small object may be present instead of a wall. In examples, points on the point cloud may be generated for rates of change that satisfy a predetermined threshold rate of change and/or for coordinates with intensity values that satisfy a threshold intensity value. The thresholds described herein may be static and/or may be dynamic and may be based at least in part on the rates of change associated with the environment in question. The result may include generation of data representing a point cloud of the environment with points on the point cloud representing points of high energy intensity and/or high rates of energy intensity change. The generation of the point clouds as described herein may be based at least in part on a two-dimensional constant false alarm rate algorithm. The point cloud generator 122 may also be configured to determine one or more sectors of the point cloud. For example, groupings and/or clusters of points in a given area may be determined to be a sector. The sectors may also include an amount of space outside the grouping of points.

At block 410, the distance component may determine lines associated with energy intensity maximums of one or more sectors of the point cloud. The distance component 124 may be configured to utilize the point cloud generated as discussed herein to determine an approximated distance between the electronic device 102 and one or more portions of the environment, such as walls. For example, for some or each of the sectors described above, a voting-based Hough transform may be utilized to find lines within a given sector that are associated with energy intensity maximums of the sector. For example, the Hough transform may be utilized to determine one or more lines that run through multiple points corresponding to the intensity maximums.

At block 412, the distance component may determine a mean line of the lines associated with the energy intensity maximums. A mean of the lines may be determined, and distance values associated with the mean line may be utilized to approximate a distance from the electronic device to the object represented by the mean line. In these examples, the object may include a wall of the environment, and the distance component 124 may determine that the wall is one portion of the boundary of the environment and may determine an approximated distance to the wall.

This process of generating lines associated with intensity maximums may be performed for the other sectors of the point cloud such that the distance between the electronic device 102 and the other walls of the environment may be determined. In addition, the intersection between walls may be determined by identifying the coordinates where the mean line for each sector intersects.

At block 414, the distance component may approximate distance(s) from the mean line. By utilizing the techniques described herein, an approximated length of the environment may be determined and an approximated width of the environment may be determined. Data indicating these approximated boundaries may be generated and stored, such as in association with account data associated with the electronic device 102. This data may be utilized by one or more applications to assist in performing one or more operations associated with those applications.

At block 416, the distance component may send one or more distance approximation indications to one or more databases, such as a user registry, and/or to the event component 128 for use in subsequent processing.

At block 418, the electronic device may generate and send data indicating an environment change, such as a moving object, to the feedback component 126. The feedback component 126 may utilize this data to assist in checking the accuracy of the boundary approximations described herein. For example, the electronic device 102 may detect a moving object in the environment and may track or otherwise determine location changes associated with the movement. The location changes may be utilized to determine whether the approximated boundary is accurate. Additionally, or alternatively, the system may utilize beaconing data sent and/or received from one or more personal devices, such as cellphones, tablets, watches, ear buds, etc. that may move within the environment. The beaconing data may indicate location changes of the personal devices, and the beaconing data may be utilized in the same or a similar way to the location of the moving object as described above. In still other examples, the location changes associated with moving objects and/or personal devices may be utilized to determine the location of a doorway and/or other ingress/egress points associated with the environment. For example, when the location changes indicate repeated moving of an object through the same or a similar location, that information may be utilized to determine that the location is associated with the ingress/egress point.

Additionally, or alternatively, the feedback component 126 may be utilized to determine when subsequent boundary approximation operations are to be performed. For example, if a moving object is detected, such as from the sensor data generated by the sensor data generator 118, the system 104 may determine that the moving object may alter the boundary approximation. In these examples, the electronic device 102 may be caused to output additional electromagnetic waves into the environment and receive additional reflected energy to perform the boundary approximation techniques described herein. In this example, the subsequent boundary approximation may be utilized in addition to or alternatively from the initial boundary approximation. In examples where multiple boundary approximations are utilized, the boundary approximations associated with instances where a moving object was not detected may be weighted more favorably than boundary approximations associated with instances where an object was moving. Determining when to perform subsequent boundary approximation may also, or alternatively, be based at least in part on determining that the electronic device 102 has moved positions. For example, a user may move the electronic device 102 to a different position in the environment and/or to another environment. In these examples, the boundary approximation techniques described herein may be performed.

In examples where the moving object is determined to move beyond the approximated boundary, the feedback component 126, at block 420, may generate new approximated boundaries and may send data indicating these approximated boundaries to the event component 128 and/or to the one or more databases described herein.

At block 422, the electronic device may detect environmental changes in the environment and may send data indicating the environmental changes to the event component 128. The event component 128 may determine that a predefined event has occurred based at least in part on the environmental changes.

At block 424, the event component 128 may determine a location of the predefined event and utilize the boundary approximation to determine whether the location is within the approximated boundary or outside of the approximated boundary. In examples where the location is within the approximated boundary, one or more predetermined actions, such as sending of a notification and/or establishment of a communication channel, may be performed. In examples where the location is outside of the approximated boundary, the device and/or remote system may refrain from performing the one or more predetermined actions.

Figure 5:
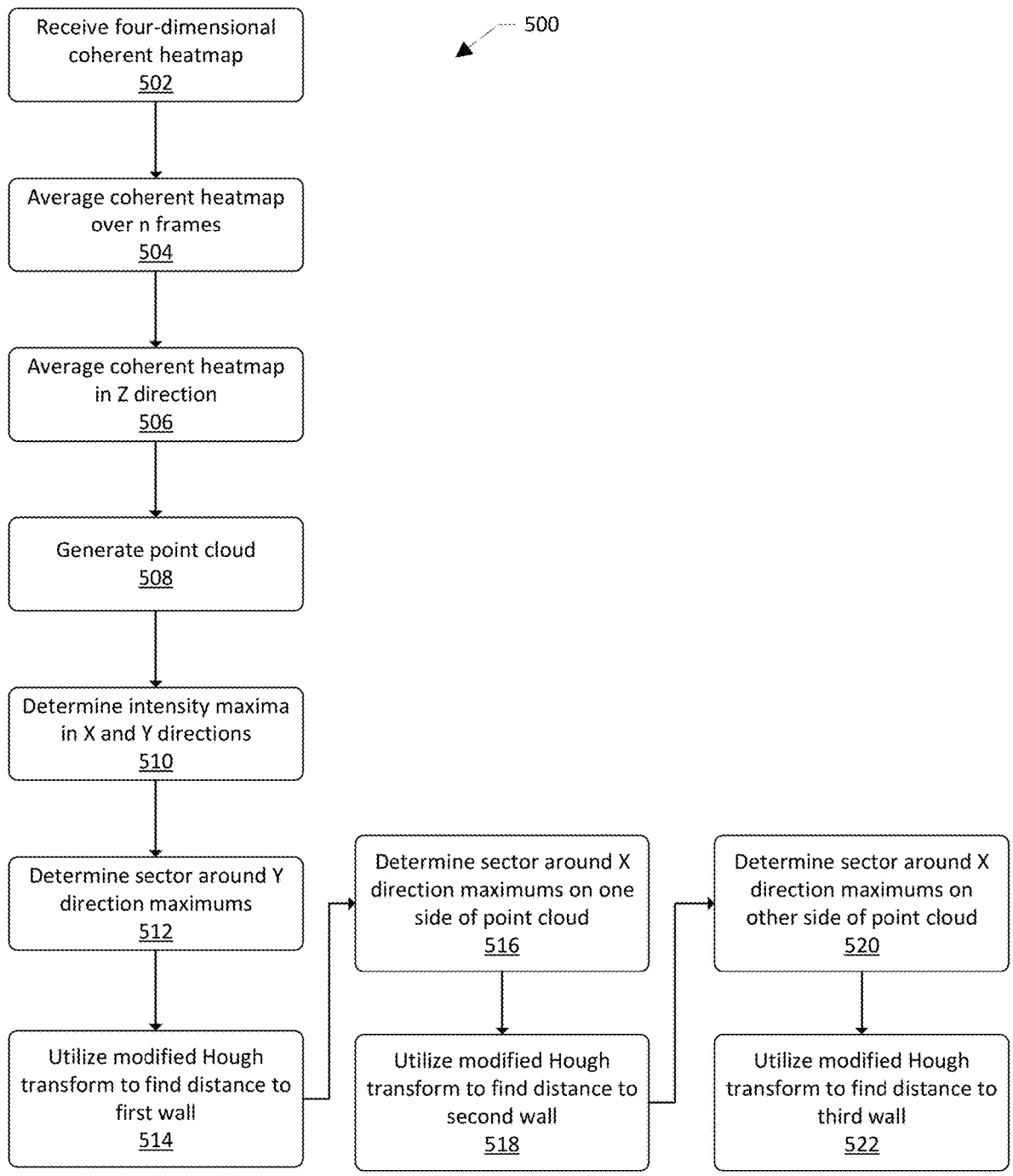
FIG. 5 illustrates a flow diagram of an example process for boundary approximation utilizing radar.
Figure 6:
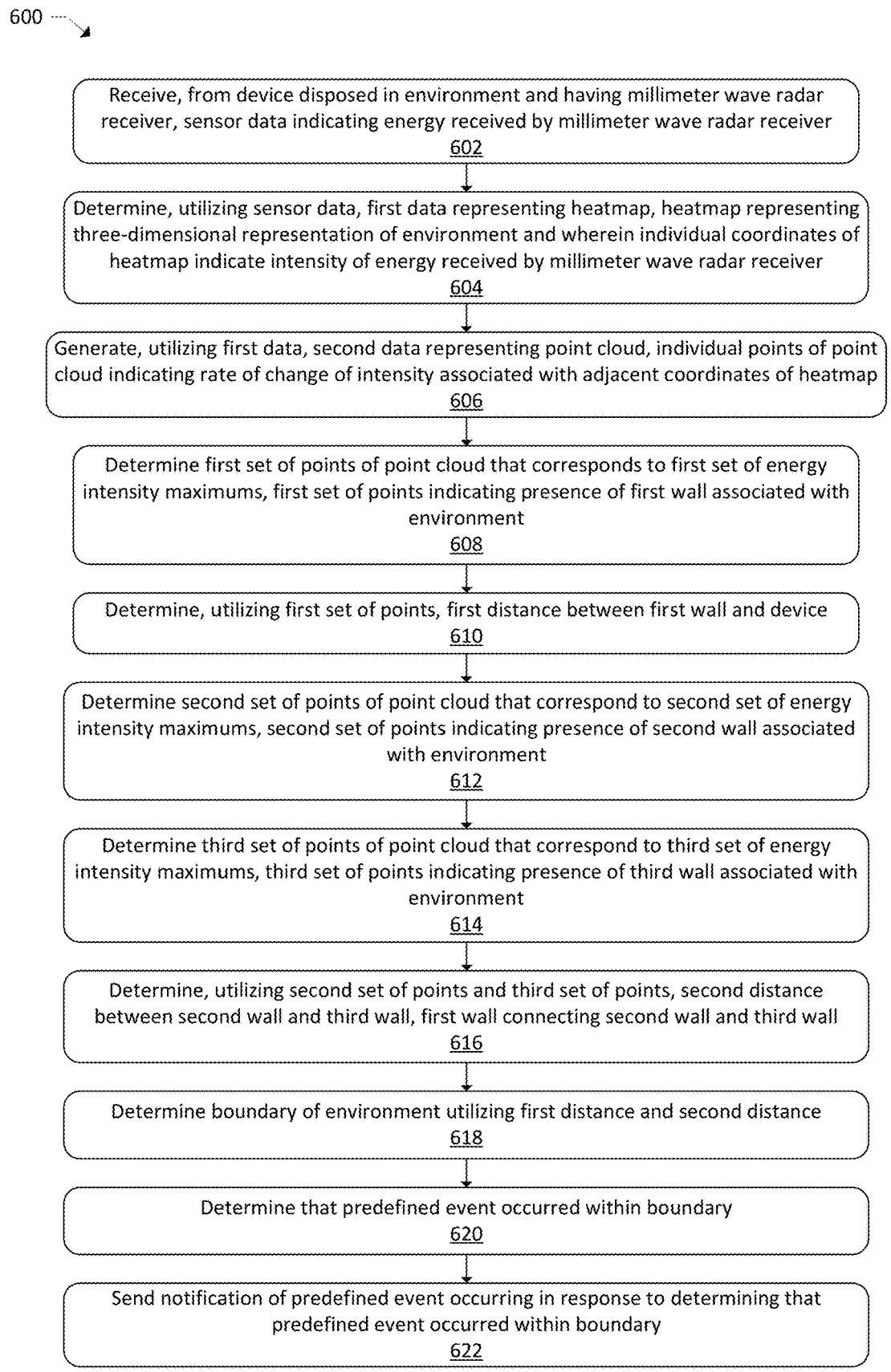
FIG. 6 illustrates a flow diagram of another example process for boundary approximation utilizing radar.

FIGS. 5-7 illustrate processes for boundary approximation utilizing radar. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4 and 8, although the processes may be implemented in a wide variety of other environments, architectures and systems.

FIG. 5 illustrates a flow diagram of an example process 500 for boundary approximation utilizing radar. The order in which the operations or steps are described is not intended to be construed as a limitation, and any number of the described operations may be combined in any order and/or in parallel to implement process 500.

At block 502, the process 500 may include receiving a four-dimensional coherent heatmap corresponding to an environment. For example, heatmap APIs may be configured to utilize sensor data from an electronic device to generate a four-dimensional coherent heatmap of the environment. The heatmap may provide an indication in three-dimensional space of the surfaces that reflected the energy emitted into the environment by the radar transmitter. In addition, for some or all of the coordinates of the heatmap, the intensity of the energy received back at the electronic device may be provided. As such, the heatmap may indicate Cartesian coordinates for points in the environment and energy intensity associated with some or each of those points. The heatmap may provide an indication of which points corresponding to the environment are associated with the highest reflected energy and the X,Y coordinates of those points. It should be understood that the generation of the heatmap as described herein may be performed by the electronic device, by the remote system associated with the electronic device (such as a system associated with speech processing functionality) and/or another system that is not associated with the electronic device. In examples where the heatmap is generated by a system not associated with the electronic device, one or more application programming interfaces (APIs) may be utilized to interface between the electronic device and the system. In these examples, the electronic device may provide the sensor data to the system utilizing the APIs and may receive data representing the heatmap back from the system.

At block 504, the process 500 may include averaging the coherent heatmap over n number of frames. For example, the heatmap may represent an averaging of locations associated with reflected energy and intensity of the reflected energy over a period of time where n number of frames are captured by the electronic device.

At block 506, the process 500 may include averaging the coherent heatmap in the Z direction. For example, the heatmap may be averaged or otherwise aggregated in the Z direction, such as by taking "slices" of the heatmap in the Z direction and averaging the energy intensities for some or all points in the X,Y axis. In some examples, certain angles and/or ranges of angles in the Z direction may be selected and averaged and/or may be weighted more heavily when averaging the intensity values.

At block 508, the process 500 may include generating a point cloud from the heatmap. For example, utilizing the heatmap, a point cloud generator may be configured to generate a point cloud representing rates of energy intensity change associated with the environment. For example, a given coordinate of the heatmap may be associated with a first energy intensity and an adjoining or other associated coordinate may be associated with a second energy intensity. In examples where there is a large rate of change of those intensities, the rate of change may indicate the presence of a surface, and particularly a wall. In examples where there is a small rate of change, a wall may not be present and/or a small object may be present instead of a wall. The result may include generation of data representing a point cloud of the environment with points on the point cloud representing points of high energy intensity and/or high rates of energy intensity change. The generation of the point clouds as described herein may be based at least in part on a two-dimensional constant false alarm rate algorithm.

At block 510, the process 500 may include determining intensity maximums in the Y and X directions. In examples, points on the point cloud may be generated for rates of change that satisfy a predetermined threshold rate of change and/or for coordinates with intensity values that satisfy a threshold intensity value. The thresholds described herein may be static and/or may be dynamic and may be based at least in part on the rates of change associated with the environment in question.

At block 512, the process 500 may include determining a sector around the Y-direction maximums. For example, the point cloud generator may also be configured to determine one or more sectors of the point cloud. For example, groupings and/or clusters of points in a given area may be determined to be a sector. The sectors may also include an amount of space outside the grouping of points.

At block 514, the process 500 may include utilizing a modified Hough transform to find a distance to a first wall. For example, a distance component may determine lines associated with energy intensity maximums of the first sector of the point cloud. The distance component may be configured to utilize the point cloud generated as discussed herein to determine an approximated distance between the electronic device and the first wall. For example, for some or each of the sectors described herein, a voting-based Hough transform may be utilized to find lines within a given sector that are associated with energy intensity maximums of the sector. For example, the Hough transform may be utilized to determine one or more lines that run through multiple points corresponding to the intensity maximums. A mean of the lines may be determined, and distance values associated with the mean line may be utilized to approximate a distance from the electronic device to the object represented by the mean line. In these examples, the object may include a wall of the environment, and the distance component may determine that the wall is one portion of the boundary of the environment and may determine an approximated distance to the wall.

At block 516, the process 500 may include determining a sector around X-direction maximums on one side of point cloud. Determining the sector around X-direction maximums may be performed in the same or a similar manner as determining the sector as described with respect to block 512.

At block 518, the process 500 may include utilizing the modified Hough transform to find a distance to a second wall. Finding the distance to the second wall may be performed in the same or a similar manner to finding the distance to the first wall as described with respect to block 514.

At block 520, the process 500 may include determining a sector around X-direction maximums on the other side of the point cloud. Determining the sector around X-direction maximums may be performed in the same or a similar manner as determining the sector as described with respect to block 512.

At block 522, the process 500 may include utilizing the modified Hough transform to find a distance to a third wall. Finding the distance to the third wall may be performed in the same or a similar manner to finding the distance to the first wall as described with respect to block 514.

FIG. 6 illustrates a flow diagram of another example process 600 for boundary approximation utilizing radar. The order in which the operations or steps are described is not intended to be construed as a limitation, and any number of the described operations may be combined in any order and/or in parallel to implement process 600.

At block 602, the process 600 may include receiving, from a device disposed in an environment and having a millimeter wave radar receiver, sensor data indicating energy received by the millimeter wave radar receiver. For example, the device may include a radar transmitter and a radar receiver array. The radar transmitter may be configured to produce and emit electromagnetic waves in the radio or microwave domain. One or more transmitting antennas of the electronic device may transmit the electromagnetic waves from the antenna(s) and into the environment in question. The electromagnetic waves, also described herein as "transmitted energy," may emanate from the antenna(s) into the environment where the transmitted energy may interact with surfaces of objects in the environment and the walls of the environment. For example, the transmitted energy may reflect off the objects and/or walls and return to one or more receiving antennas. For example, the electronic device may include the radar receiver array, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). A receiver of the electronic device may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

At block 604, the process 600 may include determining, utilizing the sensor data, first data representing a heatmap, the heatmap representing a three-dimensional representation of the environment and wherein individual coordinates of the heatmap indicate an intensity of the energy received by the millimeter wave radar receiver. For example, utilizing the sensor data, the electronic device and/or a remote system may generate a four-dimensional coherent heatmap of the environment. The heatmap may provide an indication in three-dimensional space of the surfaces that reflected the energy emitted into the environment by the radar transmitter. In addition, for some or all of the coordinates of the heatmap, the intensity of the energy received back at the electronic device may be provided. As such, the heatmap may indicate Cartesian coordinates for points in the environment and energy intensity associated with some or each of those points. In examples, the heatmap may represent an averaging of locations associated with reflected energy and intensity of the reflected energy over a period of time. The heatmap may then be averaged or otherwise aggregated in the Z direction, such as by taking "slices" of the heatmap in the Z direction and averaging the energy intensities for some or all points in the X,Y axis. In some examples, certain angles and/or ranges of angles in the Z direction may be selected and averaged and/or may be weighted more heavily when averaging the intensity values. Thereafter, the heatmap may provide an indication of which points corresponding to the environment are associated with the highest reflected energy and the X,Y coordinates of those points. It should be understood that the generation of the heatmap as described herein may be performed by the electronic device, by a remote system associated with the electronic device (such as a system associated with speech processing functionality) and/or another remote system that is not associated with the electronic device. In examples where the heatmap is generated by a remote system not associated with the electronic device, one or more application programming interfaces (APIs) may be utilized to interface between the electronic device and the remote system. In these examples, the electronic device may provide the sensor data to the remote system utilizing the APIs and may receive data representing the heatmap back from the remote system. It should be understood that the processes described herein with respect to determining distances between the device and one or more surfaces, such as walls, may be based at least in part on the device being within a line of sight of the one or more surfaces.

At block 606, the process 600 may include generating, utilizing the first data, second data representing a point cloud, individual points of the point cloud indicating a rate of change of the intensity associated with adjacent coordinates of the heatmap. For example, utilizing the heatmap, a point cloud generator may be configured to generate a point cloud representing rates of energy intensity change associated with the environment. For example, a given coordinate of the heatmap may be associated with a first energy intensity and an adjoining or other associated coordinate may be associated with a second energy intensity. In examples where there is a large rate of change of those intensities, the rate of change may indicate the presence of a surface, and particularly a wall. In examples where there is a small rate of change, a wall may not be present and/or a small object may be present instead of a wall. In examples, points on the point cloud may be generated for rates of change that satisfy a predetermined threshold rate of change and/or for coordinates with intensity values that satisfy a threshold intensity value. The thresholds described herein may be static and/or may be dynamic and may be based at least in part on the rates of change associated with the environment in question. The result may include generation of data representing a point cloud of the environment with points on the point cloud representing points of high energy intensity and/or high rates of energy intensity change. The generation of the point clouds as described herein may be based at least in part on a two-dimensional constant false alarm rate algorithm. The point cloud generator may also be configured to determine one or more sectors of the point cloud. For example, groupings and/or clusters of points in a given area may be determined to be a sector. The sectors may also include an amount of space outside the grouping of points.

At block 608, the process 600 may include determining a first set of points of the point cloud that corresponds to a first set of energy intensity maximums, the first set of points indicating the presence of a first wall associated with the environment. For example, a distance component may be configured to utilize the point cloud generated as discussed herein to determine an approximated distance between the electronic device and one or more portions of the environment, such as walls. For example, for some or each of the sectors described above, a voting-based Hough transform may be utilized to find lines within a given sector that are associated with energy intensity maximums of the sector. For example, the Hough transform may be utilized to determine one or more lines that run through multiple points corresponding to the intensity maximums.

At block 610, the process 600 may include determining, utilizing the first set of points, a first distance between the first wall and the device. For example, a mean of the lines may be determined, and distance values associated with the mean line may be utilized to approximate a distance from the electronic device to the object represented by the mean line. In these examples, the object may include a wall of the environment, and the distance component may determine that the wall is one portion of the boundary of the environment and may determine an approximated distance to the wall.

At block 612, the process 600 may include determining a second set of points of the point cloud that correspond to a second set of energy intensity maximums, the second set of points indicating the presence of a second wall associated with the environment. Determining the second set of points may be performed in the same or a similar manner as determining the first set of points as described with respect to block 608.

At block 614, the process 600 may include determining a third set of points of the point cloud that correspond to a third set of energy intensity maximums, the third set of points indicating the presence of a third wall associated with the environment. Determining the third set of points may be performed in the same or a similar manner as determining the first set of points as described with respect to block 608.

At block 616, the process 600 may include determining, utilizing the second set of points and the third set of points, a second distance between the second wall and the third wall, the first wall connecting the second wall and the third wall. For example, intersections between the first lines and the second lines, and between the first lines and the third lines, may be utilized to determine locations of intersections between those walls. The locations of the intersections may be utilized to determine the second approximated distance.

At block 618, the process 600 may include determining a boundary of the environment utilizing the first distance and the second distance. For example, determining the boundary may include generating data indicating that the first distance is a length of the environment and the second distance is the width of the environment, or vice versa.

At block 620, the process 600 may include determining that a predefined event occurred within the boundary. For example, an event component may be configured to determine, from sensor data indicating an environmental change, that a predefined event has occurred, such as a person falling, a dog jumping up on a table, a window breaking, a package being left on a doorstep, etc. While the event component may utilize multiple data types to determine if a predetermined event has occurred, the user of radar-based data will be utilized by way of example. For example, a given device may include an ultra-wide band antenna configured to receive electromagnetic waves with a bandwidth at or around 6 GHz. The device may also include a millimeter-wave band antenna configured to receive electromagnetic waves with a bandwidth at or around 60 GHz. This dual-band radar functionality may be utilized to detect movement that is likely to correspond to a predefined event, such as a person falling. By utilizing dual-band radar functionality as described herein, the radar may be able to detect event occurrences in rooms or other types of spaces in both the room in which the sensing device is located and other, such as adjacent, rooms. For example, the electromagnetic waves may be received at the antennas and corresponding sensor data may be generated. The sensor data may be utilized by the device to determine if one or more predefined events have occurred. Event data indicating that the device has determined that a predefined event has occurred may be sent from the device to a remote system for event-detection confirmation processing. In other examples, the sensor data may be sent from the device to another device and/or system, such as a remote system configured to process the sensor data, to determine whether the one or more predefined events has occurred. In this way, detection of an event may include detection of a motion-based event utilizing one or more of the processes and/or sensors described herein. When detecting events, one or more sensors may be utilized, such as the radar sensors described herein, microphones, motion sensors, cameras, temperature sensors, an accelerometer, a gyroscope, a heartbeat sensor, a liquid, such as perspiration, sensor, a global positioning system (GPS) sensor, and/or other sensors configured to detect an environmental change.

At block 622, the process 600 may include sending a notification of the predefined event occurring in response to determining that the predefined event occurred within the boundary. For example, the event component may query the account data for the boundary information and may determine that a location associated with the detected event either was within the approximated boundary or was outside the approximated boundary. In examples where the event occurred within the approximated boundary, an action may be taken by the electronic device or an associated remote system. The action may include sending a notification of occurrence of the event to a personal device associated with the electronic device, establishing a communication channel between the electronic device and the personal device, particularly in examples where the electronic device includes the microphone and speaker, searching for other occupants associated with the environment to lend aid, etc. In examples where the event occurred outside the approximated boundary, the device may determine to refrain from performing the one or more actions that would otherwise be performed in examples where the event was within the boundary.

Additionally, or alternatively, the process 600 may include determining, utilizing at least a first portion of the first set of points and at least a portion of the second set of points, a first intersection of the first wall and the second wall. The process 600 may also include determining, utilizing at least a second portion of the first set of points and at least a portion of the third set of points, a second intersection of the first wall and the third wall. In these examples, determining the second distance between the second wall and the third wall may be based at least in part on a distance between the first intersection and the second intersection.

Additionally, or alternatively, the process 600 may include determining that the first set of points of the point cloud have a high energy intensity in relation to other points of the point cloud. The process 600 may also include determining that the first set of points are grouped together in a portion of the point cloud. The process 600 may also include identifying the first segment from the first set of points having the high energy intensity in relation to the other points and the first set of points being grouped together.

Additionally, or alternatively, the process 600 may include determining that an event has occurred, the event including at least one of: detection of movement from the sensor data; or a change in position of the device from when the device generated the sensor data. The process 600 may also include generating, in response to determining that the event has occurred, a command configured to cause the device to generate additional sensor data for redetermining the boundary. The process may also include sending the command to the device and receiving the additional sensor data from the device. In these examples, the additional sensor data may be utilized for at least one of determining the first distance or determining the second distance.

FIG. 7 illustrates a flow diagram of another example process 700 for boundary approximation utilizing radar. The order in which the operations or steps are described is not intended to be construed as a limitation, and any number of the described operations may be combined in any order and/or in parallel to implement process 700.

At block 702, the process 700 may include receiving first data representing a map of an environment, wherein individual coordinates of the map indicate intensity of energy received from a device disposed in the environment. For example, utilizing sensor data from the electronic device, the electronic device and/or a remote system may generate a four-dimensional coherent heatmap of the environment. The heatmap may provide an indication in three-dimensional space of the surfaces that reflected the energy emitted into the environment by the radar transmitter. In addition, for some or all of the coordinates of the heatmap, the intensity of the energy received back at the electronic device may be provided. As such, the heatmap may indicate Cartesian coordinates for points in the environment and energy intensity associated with some or each of those points. In examples, the heatmap may represent an averaging of locations associated with reflected energy and intensity of the reflected energy over a period of time. The heatmap may then be averaged or otherwise aggregated in the Z direction, such as by taking "slices" of the heatmap in the Z direction and averaging the energy intensities for some or all points in the X,Y axis. In some examples, certain angles and/or ranges of angles in the Z direction may be selected and averaged and/or may be weighted more heavily when averaging the intensity values. Thereafter, the heatmap may provide an indication of which points corresponding to the environment are associated with the highest reflected energy and the X,Y coordinates of those points. It should be understood that the generation of the heatmap as described herein may be performed by the electronic device, by a remote system associated with the electronic device (such as a system associated with speech processing functionality) and/or another remote system that is not associated with the electronic device. In examples where the heatmap is generated by a remote system not associated with the electronic device, one or more application programming interfaces (APIs) may be utilized to interface between the electronic device and the remote system. In these examples, the electronic device may provide the sensor data to the remote system utilizing the APIs and may receive data representing the heatmap back from the remote system.

At block 704, the process 700 may include generating, based at least in part on the first data, second data indicating a rate of change of the intensity associated with adjacent coordinates of the map. For example, utilizing the heatmap, a point cloud generator may be configured to generate a point cloud representing rates of energy intensity change associated with the environment. For example, a given coordinate of the heatmap may be associated with a first energy intensity and an adjoining or other associated coordinate may be associated with a second energy intensity. In examples where there is a large rate of change of those intensities, the rate of change may indicate the presence of a surface, and particularly a wall. In examples where there is a small rate of change, a wall may not be present and/or a small object may be present instead of a wall. In examples, points on the point cloud may be generated for rates of change that satisfy a predetermined threshold rate of change and/or for coordinates with intensity values that satisfy a threshold intensity value. The thresholds described herein may be static and/or may be dynamic and may be based at least in part on the rates of change associated with the environment in question. The result may include generation of data representing a point cloud of the environment with points on the point cloud representing points of high energy intensity and/or high rates of energy intensity change. The generation of the point clouds as described herein may be based at least in part on a two-dimensional constant false alarm rate algorithm. The point cloud generator may also be configured to determine one or more sectors of the point cloud. For example, groupings and/or clusters of points in a given area may be determined to be a sector. The sectors may also include an amount of space outside the grouping of points. When rate of change is described herein, that rate of change should be considered with respect to a rate of change of a physical space of the environment, and not necessarily a rate of change considered with respect to time.

At block 706, the process 700 may include determining a first set of points, associated with the second data, that correspond to a first set of energy intensity maximums. For example, a distance component may be configured to utilize the point cloud generated as discussed herein to determine an approximated distance between the electronic device and one or more portions of the environment, such as walls. For example, for some or each of the sectors described above, a voting-based Hough transform may be utilized to find lines within a given sector that are associated with energy intensity maximums of the sector. For example, the Hough transform may be utilized to determine one or more lines that run through multiple points corresponding to the intensity maximums.

At block 708, the process 700 may include determining, based at least in part on the first set of points, a first distance between a first boundary structure of the environment, represented by the first set of points, and the device. For example, a mean of the lines may be determined, and distance values associated with the mean line may be utilized to approximate a distance from the electronic device to the object represented by the mean line. In these examples, the object may include a wall of the environment, and the distance component may determine that the wall is one portion of the boundary of the environment and may determine an approximated distance to the wall.

At block 710, the process 700 may include determining a second set of points, associated with the second data, that correspond to a second set of energy intensity maximums. Determining the second set of points may be performed in the same or a similar manner as determining the first set of points as described with respect to block 706.

At block 712, the process 700 may include determining a third set of points, associated with the second data, that correspond to a third set of energy intensity maximums. Determining the third set of points may be performed in the same or a similar manner as determining the first set of points as described with respect to block 706.

At block 714, the process 700 may include determining, based at least in part on the second set of points and the third set of points, a second distance between a second boundary structure represented by the second set of points and a third boundary structure represented by the third set of points, the first boundary structure connecting the second boundary structure and the third boundary structure. For example, intersections between the first lines and the second lines, and between the first lines and the third lines, may be utilized to determine locations of intersections between those portions of the environment. The locations of the intersections may be utilized to determine the second approximated distance.

Additionally, or alternatively, the process 700 may include determining, based at least in part on at least a first portion of the first set of points and at least a portion of the second set of points, a first intersection of the first boundary structure and the second boundary structure. The process 700 may also include determining, based at least in part on at least a second portion of the first set of points and at least a portion of the third set of points, a second intersection of the first boundary structure and the third boundary structure. In these examples, determining the second distance may be based at least in part on a distance between the first intersection and the second intersection.

Additionally, or alternatively, the process 700 may include determining that the first set of points have a high energy intensity in relation to other points associated with the second data. The process 700 may also include determining that the first set of points are grouped together. The process 700 may also include identifying the first set of points based at least in part on the first set of points having the high energy intensity in relation to the other points and the first set of points being grouped together.

Additionally, or alternatively, the process 700 may include determining that a change in position of the device from when the device received the energy intensity values has occurred. The process 700 may also include generating, based at least in part on determining that the change in position has occurred, a command configured to cause the device to generate sensor data for re-determining the boundary. The process 700 may also include sending the command to the device and receiving the sensor data from the device. In these examples, the sensor data may be utilized for at least one of determining the first distance or determining the second distance.

Additionally, or alternatively, the process 700 may include identifying a moving object from sensor data received from the device. The process 700 may also include determining that the object moves through the first boundary segment of the environment at a location. The process 700 may also include determining that the location of the first boundary section of the environment corresponds to a door based at least in part on the object moving through the first boundary section at the location.

Additionally, or alternatively, the process 700 may include generating third data indicating location changes of a moving object in the environment. The process 700 may also include determining that a distance between the moving object and the device exceeds the first distance. The process 700 may also include causing the first distance to be increased based at least in part on the distance between the moving object and the device exceeding the first distance.

Additionally, or alternatively, the process 700 may include determining, based at least in part on sensor data received from the device, that a predefined event has occurred. The process 700 may also include determining that the predefined event occurred a distance from the device that exceeds the first distance. The process 700 may also include determining to refrain from sending a notification of the predefined event occurring based at least in part on the distance exceeding the first distance.

Additionally, or alternatively, the process 700 may include determining, based at least in part on sensor data received from the device, that a predefined event has occurred. The process 700 may also include determining that the predefined event occurred at a distance from the device that is within the first distance. The process 700 may also include sending a notification of the predefined event occurring based at least in part on the distance being within the first distance.

Figure 8:
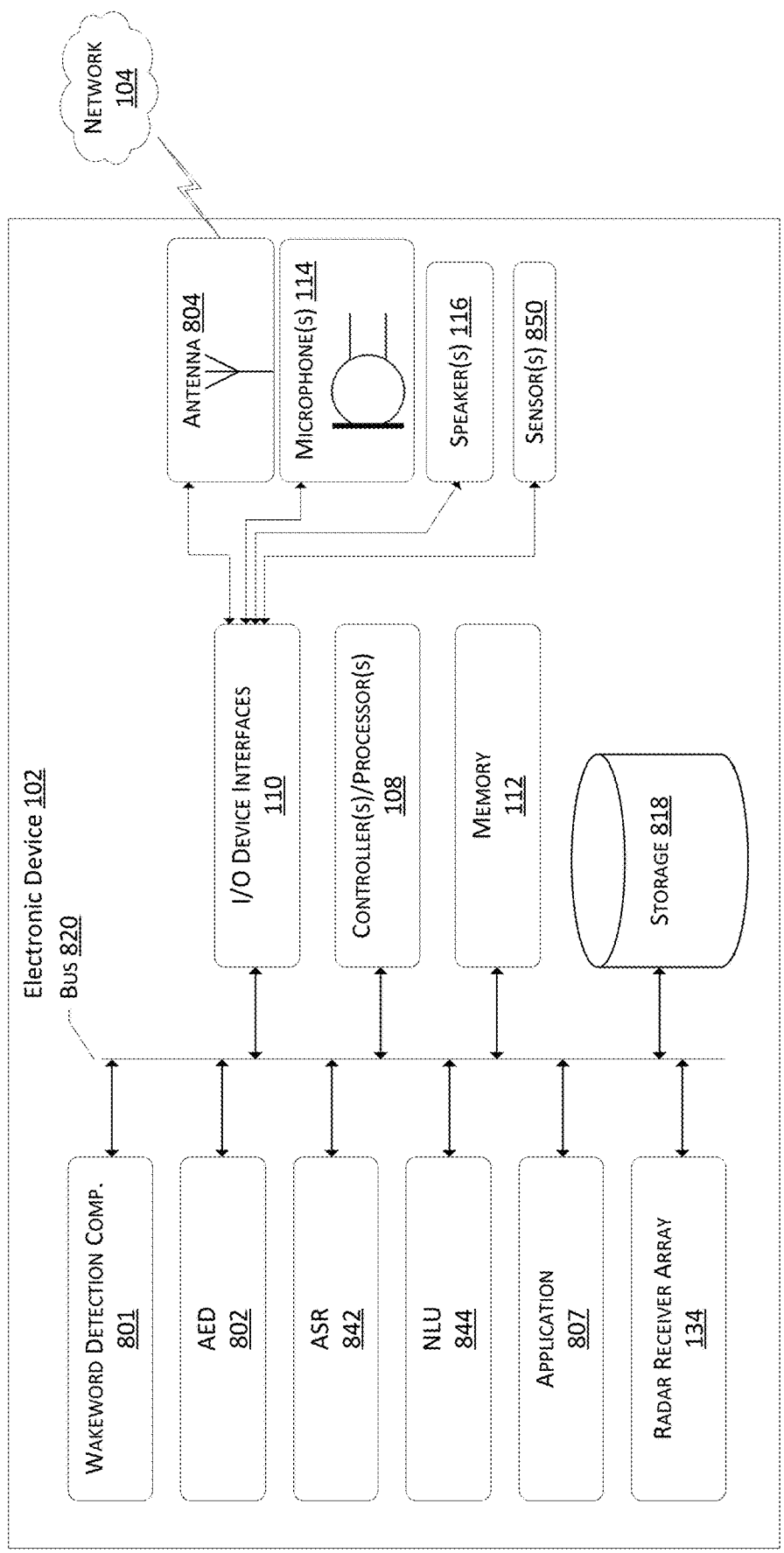
FIG. 8 illustrates a conceptual diagram of example components of an electronic device that may be utilized in association with boundary approximation.

FIG. 8 illustrates a conceptual diagram of example components of an electronic device 102 that may be utilized in association with boundary approximation. The device 102 may be implemented as a standalone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 114, a power source, and functionality for sending generated audio data via one or more antennas 804 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 114, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 8 may include one or more controllers/processors 108, that may include a central processing unit (CPU) for processing data and computer-readable instructions, and memory 112 for storing data and instructions of the device 102. The device 102 may also be connected to removable or external non-volatile memory and/or storage, such as a removable memory card, memory key drive, networked storage, etc., through input/output device interfaces 110.

Computer instructions for operating the device 102 and its various components may be executed by the device's controller(s)/processor(s) 110, using the memory 112 as temporary "working" storage at runtime. A device's computer instructions may be stored in a non-transitory manner in non-volatile memory 112, storage 818, or an external device (s). Alternatively, some or all of the executable instructions may be embedded in hardware or firmware on the device 102 in addition to or instead of software.

The device 102 may include input/output device interfaces 110. A variety of components may be connected through the input/output device interfaces 110. Additionally, the device 102 may include an address/data bus 820 for conveying data among components of the respective device.

Each component within a device 102 may also be directly connected to other components in addition to, or instead of, being connected to other components across the bus 920.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 108 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 110 that connect to a variety of components. This wired or a wireless audio and/or video port may allow for input/output of audio/video to/from the device 102. The device 102 may also include an audio capture component. The audio capture component may be, for example, a microphone 114 or array of microphones, a wired headset or a wireless headset, etc. The microphone 114 may be configured to capture audio. If an array of microphones is included, approximate distance to a sound's point of origin may be determined using acoustic localization based on time and amplitude differences between sounds captured by different microphones of the array. The device 102 (using microphone 114, wakeword detection component 801, ASR component 842, etc.) may be configured to generate audio data corresponding to captured audio. The device 102 (using input/output device interfaces 110, antenna 804, etc.) may also be configured to transmit the audio data to the remote system 104 for further processing or to process the data using internal components such as a wakeword detection component 801.

Via the antenna(s) 804, the input/output device interface 110 may connect to one or more networks 106 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 106, the speech-processing system may be distributed across a networked environment. Accordingly, the device 102 and/or the remote system 104 may include an ASR component 842. The ASR component 842 of device 102 may be of limited or extended capabilities. The ASR component 842 may include language models stored in ASR model storage component, and an ASR component 842 that performs automatic speech recognition. If limited speech recognition is included, the ASR component 842 may be configured to identify a limited number of words, such as keywords detected by the device, whereas extended speech recognition may be configured to recognize a much larger range of words.

The device 102 and/or the remote system 104 may include a limited or extended NLU component 844. The NLU component 844 of device 102 may be of limited or extended capabilities. The NLU component 844 may comprise a name entity recognition module, an intent classification module and/or other components. The NLU component 844 may also include a stored knowledge base and/or entity library, or those storages may be separately located.

In examples, AED 802 may also be performed by the device 102. In these examples, the operations may include causing the AED component 802 to be enabled or otherwise turned on, or the operations may include causing the AED component 802 to transition from a first mode to a second mode representing a higher sensitivity to audio data generated by the microphone 114. The AED component 802 may utilize the audio data generated by the microphone 114 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 802 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 802 may determine that the audio fingerprint corresponds to at least one of the reference audio fingerprints, such as to a given confidence level, and may generate confirmatory data indicating that the audio fingerprint corresponds to the at least one reference audio fingerprint.

The device 102 and/or the remote system 104 may also include an application 807 that is configured to execute commands/functions associated with a spoken command as described herein. The device 102 may include a wake word engine, which may be a separate component or may be included in an ASR component 842. The wakeword detection component 801 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred. In examples, the device 102 and may not include speaker(s) 116 and may utilize speaker(s) of an external or peripheral device to output audio via the speaker(s) of the external/peripheral device.

T antennas 804 may be configured to send and receive electromagnetic waves in radio and/or microwave domains. At least one of the antennas may be configured to send and receive electromagnetic waves having a bandwidth in the ultra-wide band range, such as a bandwidth at or around 6 GHz. At least one other of the antennas may be configured to send and receive electromagnetic waves having a bandwidth in the millimeter wave range, such as a bandwidth at or around 60 GHz. It should be understood that while the examples used herein describe one antenna associated with the ultra-wide band range and one antenna associated with the millimeter band range, each or either of these antennas may include multiple antennas and/or antenna arrays. The antennas may transmit the electromagnetic waves into the environment in which the device 102 is located and may receive the electromagnetic waves back at the device 102. The distortion and/or change in the electromagnetic waves as received by the device 102 may indicate motion and/or a change in position of one or more objects within the environment. The changes in motion that may be detected may include, for example, entry and/or exit of a user from the environment, location of the user relative to the device 102, number of users in the environment, an angle at which a user is positioned relative to the device 102, a posture of a user, movement of a user within the environment, a direction of travel of a user, a size of a user, etc.

The electromagnetic waves may be received by the antennas. The corresponding sensor data may be sent to the event component, which may determine whether one or more predefined events has occurred based at least in part on the sensor data. For example, one or more models may be configured to receive the sensor data as input and determine if one or more characteristics associated with the audio data correspond to reference sensor data associated with the predefined event(s). By way of example, in the case of a user fall, the sensor data may indicate that the position of the user has changed quickly from a standing to a prone or otherwise horizontal position and/or to a kneeling position. By way of additional example, the sensor data may indicate a slouching motion of a user. In these examples, the event component may analyze the sensor data with respect to reference data indicated to correspond to these and/or other events. When the event component determines that the sensor data corresponds to the reference sensor data, such as above a threshold confidence, the event component may identify, determine, and/or generate event data indicating that the predefined event has occurred. The event data may be sent from the device 102 to the remote system 104 for processing.

To assist with the detection of acoustic events, for example, the device 102 may include one or more sensors 850 that may be configured to detect environmental changes. The sensors 850 may include, for example, radar, audio sensors such as the microphones 114, ultrasonic sensors, cameras, temperature sensors, motion sensors, light sensors, etc. The electronic device 102 may also include an ultrasonic component. The ultrasonic component may include functionality that allows for sound waves in the ultrasonic frequency to be emitted and received for the detection of predefined events and/or the detection of subjects in an environment.

Additionally, the electronic device 102 may include the radar receiver array 134, which may include an array of receiving antennas that may be configured to receive the reflected energy. In examples, the transmitting antenna(s) and the receiving antenna(s) may be the same antennas. In other examples, the transmitting antenna(s) may differ from the receiving antenna(s). A receiver of the electronic device 102 may receive the reflected energy and may generate corresponding sensor data that may provide an indication of a location from which the energy reflected and additional information associated with the reflected energy, such as an intensity of the energy received by the receiving antennas. In examples, the receiver may include a millimeter wave radar multiple input multiple output (MIMO) receiver.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
receiving, from a device disposed in an environment and having a millimeter wave radar receiver, sensor data indicating energy received by the millimeter wave radar receiver;
determining, utilizing the sensor data, first data representing a heatmap, the heatmap representing a three-dimensional representation of the environment and wherein individual coordinates of the heatmap indicate an intensity of the energy received by the millimeter wave radar receiver;
generating, utilizing the first data, second data representing a point cloud, individual points of the point cloud indicating a rate of change of the intensity associated with adjacent coordinates of the heatmap;
determining a first set of points of the point cloud that corresponds to a first set of energy intensity maximums, the first set of points indicating the presence of a first wall associated with the environment;
determining, utilizing the first set of points, a first distance between the first wall and the device;
determining a second set of points of the point cloud that correspond to a second set of energy intensity maximums, the second set of points indicating the presence of a second wall associated with the environment;
determining a third set of points of the point cloud that correspond to a third set of energy intensity maximums, the third set of points indicating the presence of a third wall associated with the environment;
determining, utilizing the second set of points and the third set of points, a second distance between the second wall and the third wall, the first wall connecting the second wall and the third wall; and
determining a boundary of the environment utilizing the first distance and the second distance.

2. The system of claim 1, the operations further comprising:
determining, utilizing at least a first portion of the first set of points and at least a portion of the second set of points, a first intersection of the first wall and the second wall;
determining, utilizing at least a second portion of the first set of points and at least a portion of the third set of points, a second intersection of the first wall and the third wall; and
wherein determining the second distance between the second wall and the third wall is based at least in part on a distance between the first intersection and the second intersection.

3. The system of claim 1, the operation further comprising:
determining that the first set of points of the point cloud have a high energy intensity in relation to other points of the point cloud;
determining that the first set of points are grouped together in a portion of the point cloud; and
identifying a first segment of the point cloud representing the first wall from the first set of points having the high energy intensity in relation to the other points and the first set of points being grouped together.

4. The system of claim 1, the operations further comprising:
determining that an event has occurred, the event including at least one of:
detection of movement from the sensor data; or
a change in position of the device from when the device generated the sensor data;
generating, in response to determining that the event has occurred, a command configured to cause the device to generate additional sensor data for redetermining the boundary;
sending the command to the device;
receiving the additional sensor data from the device; and
wherein the additional sensor data is utilized for at least one of determining the first distance or determining the second distance.

5. A method, comprising:
receiving first data representing a map of an environment, wherein individual coordinates of the map indicate intensity of energy received from a device disposed in the environment;
generating, based at least in part on the first data, second data indicating a rate of change of the intensity associated with adjacent coordinates of the map;
determining a first set of points, associated with the second data, that correspond to a first set of energy intensity maximums;
determining, based at least in part on the first set of points, a first distance between a first boundary structure of the environment, represented by the first set of points, and the device;
determining a second set of points, associated with the second data, that correspond to a second set of energy intensity maximums;
determining a third set of points, associated with the second data, that correspond to a third set of energy intensity maximums; and
determining, based at least in part on the second set of points and the third set of points, a second distance between a second boundary structure represented by the second set of points and a third boundary structure represented by the third set of points, the first boundary structure connecting the second boundary structure and the third boundary structure.

6. The method of claim 5, further comprising:
determining, based at least in part on at least a first portion of the first set of points and at least a portion of the second set of points, a first intersection of the first boundary structure and the second boundary structure;
determining, based at least in part on at least a second portion of the first set of points and at least a portion of the third set of points, a second intersection of the first boundary structure and the third boundary structure; and
wherein determining the second distance comprises determining the second distance based at least in part on a distance between the first intersection and the second intersection.

7. The method of claim 5, the further comprising:
determining that the first set of points have a high energy intensity in relation to other points associated with the second data;
determining that the first set of points are grouped together; and
identifying the first set of points based at least in part on the first set of points having the high energy intensity in relation to the other points and the first set of points being grouped together.

8. The method of claim 5, the further comprising:
determining that a change in position of the device from when the device received the energy has occurred;
generating, based at least in part on determining that the change in position has occurred, a command configured to cause the device to generate sensor data for redetermining the boundary;
sending the command to the device;
receiving the sensor data from the device; and
wherein the sensor data is utilized for at least one of determining the first distance or determining the second distance.

9. The method of claim 5, further comprising:
identifying a moving object from sensor data received from the device;
determining that the object moves through the first boundary segment of the environment at a location; and
determining that the location of the first boundary section of the environment corresponds to a door based at least in part on the object moving through the first boundary section at the location.

10. The method of claim 5, further comprising:
generating third data indicating location changes of a moving object in the environment;
determining that a distance between the moving object and the device exceeds the first distance; and
causing the first distance to be increased based at least in part on the distance between the moving object and the device exceeding the first distance.

11. The method of claim 5, further comprising:
determining, based at least in part on sensor data received from the device, that a predefined event has occurred;
determining that the predefined event occurred a distance from the device that exceeds the first distance; and
determining to refrain from sending a notification of the predefined event occurring based at least in part on the distance exceeding the first distance.

12. The method of claim 5, further comprising:
determining, based at least in part on sensor data received from the device, that a predefined event has occurred;
determining that the predefined event occurred at a distance from the device that is within the first distance; and
sending a notification of the predefined event occurring based at least in part on the distance being within the first distance.

13. A device, comprising:
a radar transmitter;
a radar receiver array;
one or more processors; and
non-transitory computer-readable media storing computer-executable instructions that, when executed by the one or more processors, cause the one or more processors to perform operations comprising:
causing output, by the radar transmitter, of first energy into an environment;
receiving, by the radar receiver array, second energy representing the first energy as reflected by surfaces in the environment;
generating sensor data corresponding to the second energy;
determining, based at least in part on the sensor data, first data representing a map of the environment, wherein individual coordinates of the map indicate intensity of the second energy received by the radar receiver array;
generating, based at least in part on the first data, second data indicating a rate of change of the intensity associated with adjacent coordinates of the map;
determining a first set of points, associated with the second data, that correspond to a first set of energy intensity maximums;
determining, based at least in part on the first set of points, a first distance between a first boundary structure of the environment and the device;
determining a second set of points, associated with the second data, that correspond to a second set of energy intensity maximums;
determining a third set of points, associated with the second data, that correspond to a third set of energy intensity maximums; and
determining, based at least in part the second set of point and the third set of points, a second distance between a second boundary structure represented by the second set of points and a third boundary structure represented by the third set of points, the first boundary structure connecting the second boundary structure and the third boundary structure.

14. The device of claim 13, the operations further comprising:
determining, based at least in part on at least a first portion of the first set of points and at least a portion of the second set of points, a first intersection of the first boundary structure and the second boundary structure;
determining, based at least in part on at least a second portion of the first set of points and at least a portion of the third set of points, a second intersection of the first boundary structure and the third boundary structure; and
wherein determining the second distance comprises determining the second distance based at least in part on a distance between the first intersection and the second intersection.

15. The device of claim 13, the operations further comprising:
- determining that individual ones of the first set of points are within a threshold distance from each other indicating that the first set of points are grouped together; and
- identifying the first set of points based at least in part on the individual ones of the first set of points being within the threshold distance from each other.

16. The device of claim 13, the operations further comprising:
- determining that a moving object was present while the radar receiver array received the second energy;
- causing, based at least in part on determining that the moving object was present, the radar transmitter to output third energy into the environment;
- receiving, by the radar receiver array, fourth energy representing the third energy as reflected by the surfaces in the environment;
- generating additional sensor data from the fourth energy; and
- wherein at least one of determining the first distance or determining the second distance is based at least in part on the additional sensor data.

17. The device of claim 13, the operations further comprising:
- identifying a moving object from the sensor data;
- determining that the object moves through the first boundary structure of the environment at a location; and
- determining that the location of the first boundary structure of the environment corresponds to a door based at least in part on the object moving through the first boundary structure at the location.

18. The device of claim 13, the operations further comprising:
- generating third data indicating location changes of a moving object detected in the environment;
- determining that a distance between the moving object and the device exceeds the first distance; and
- causing the first distance to be increased based at least in part on the distance between the moving object and the device exceeding the first distance.

19. The device of claim 13, the operations further comprising:
- determining that a predefined event has occurred indicating an environmental change;
- determining that the predefined event occurred at a distance from the device that exceeds the first distance; and
- determining to refrain from sending an indication of the predefined event occurring based at least in part on the distance exceeding the first distance.

20. The device of claim 13, the operations further comprising:
- determining that a predefined event has occurred indicating an environmental change;
- determining that the predefined event occurred at a distance from the device that is within the first distance; and
- sending an indication of the predefined event occurring based at least in part on the distance being within the first distance.

* * * * *